United States Patent
Douglas

(10) Patent No.: US 6,250,650 B1
(45) Date of Patent: Jun. 26, 2001

(54) AUTOMATIC FIFTH WHEEL LOADING AND UNLOADING SYSTEM

(76) Inventor: Leland H. Douglas, 3806 Lafayette La., Pineville, LA (US) 71360-4016

( * ) Notice: Subject to any disclaimer, the term of this patent is extended or adjusted under 35 U.S.C. 154(b) by 0 days.

(21) Appl. No.: 08/989,596

(22) Filed: Dec. 12, 1997

Related U.S. Application Data

(60) Provisional application No. 60/033,098, filed on Dec. 17, 1996.

(51) Int. Cl.[7] .................................................. B60S 9/12
(52) U.S. Cl. ................................. 280/6.155; 280/425.1; 280/431; 280/475; 280/477; 280/766.1
(58) Field of Search .................................. 280/434, 425.1, 280/425.2, 427, 429, 431, 475, 477, 6.16, 6.155, 6.153, DIG. 1, 432, 763.1, 764.1, 765.1, 766.1, 414.5, 433, 436; 701/124

(56) References Cited

U.S. PATENT DOCUMENTS

| | | |
|---|---|---|
| 2,193,049 * | 3/1940 | Walther et al. . |
| 2,988,375 * | 6/1961 | Lich . |
| 3,912,288 * | 10/1975 | F'Geppert . |
| 4,097,840 | 6/1978 | Chappelle ........................... 340/52 R |
| 4,150,840 * | 4/1979 | Banerjea et al. . |
| 4,253,680 * | 3/1981 | Albright et al. . |
| 4,368,899 * | 1/1983 | Smalley et al. . |
| 4,560,184 | 12/1985 | Williams ........................... 280/478 B |
| 4,792,151 | 12/1988 | Feld .................................. 280/406 A |
| 4,961,590 | 10/1990 | Davenport .............................. 280/477 |
| 4,991,865 | 2/1991 | Francisco .............................. 280/477 |
| 5,037,123 | 8/1991 | Smith ................................... 280/508 |
| 5,291,407 | 3/1994 | Young ............................. 364/424.07 |
| 5,580,095 * | 12/1996 | Fukumoto . |
| 5,625,335 * | 4/1997 | Kelly . |

FOREIGN PATENT DOCUMENTS

| | | |
|---|---|---|
| 3226360 | 1/1984 | (DE) . |
| 444695 | 6/1975 | (RU) . |
| 1122524 | 11/1984 | (RU) . |
| 1169874 | 7/1985 | (RU) . |

* cited by examiner

Primary Examiner—Anne Marie Boehler
(74) Attorney, Agent, or Firm—John M. Harrison

(57) ABSTRACT

An automatic fifth wheel loading and unloading system which is designed to automatically unlock and disengage a trailer from the fifth wheel apparatus in a towing vehicle such as a pickup truck and level and then recouple the trailer to the vehicle. The automatic fifth wheel loading and unloading system initially raises the trailer coupler a predetermined distance, unlocks the trailer hitch mechanism in the fifth wheel and opens it on command. The truck or towing vehicle is then pulled forwardly from beneath the trailer coupling mechanism and the trailer is automatically lowered into a level position. When the trailer is to be recoupled to the towing vehicle, the trailer is automatically raised to an access position by operation of a memory circuit, the truck is positioned such that the fifth wheel mechanism is located beneath the trailer coupling mechanism and the trailer coupling mechanism is automatically lowered into engagement with the fifth wheel. Infrared transmitter and receiver devices are utilized to insure proper clearance between the trailer coupling mechanism and the fifth wheel as well as sensing the level position of the trailer.

35 Claims, 19 Drawing Sheets

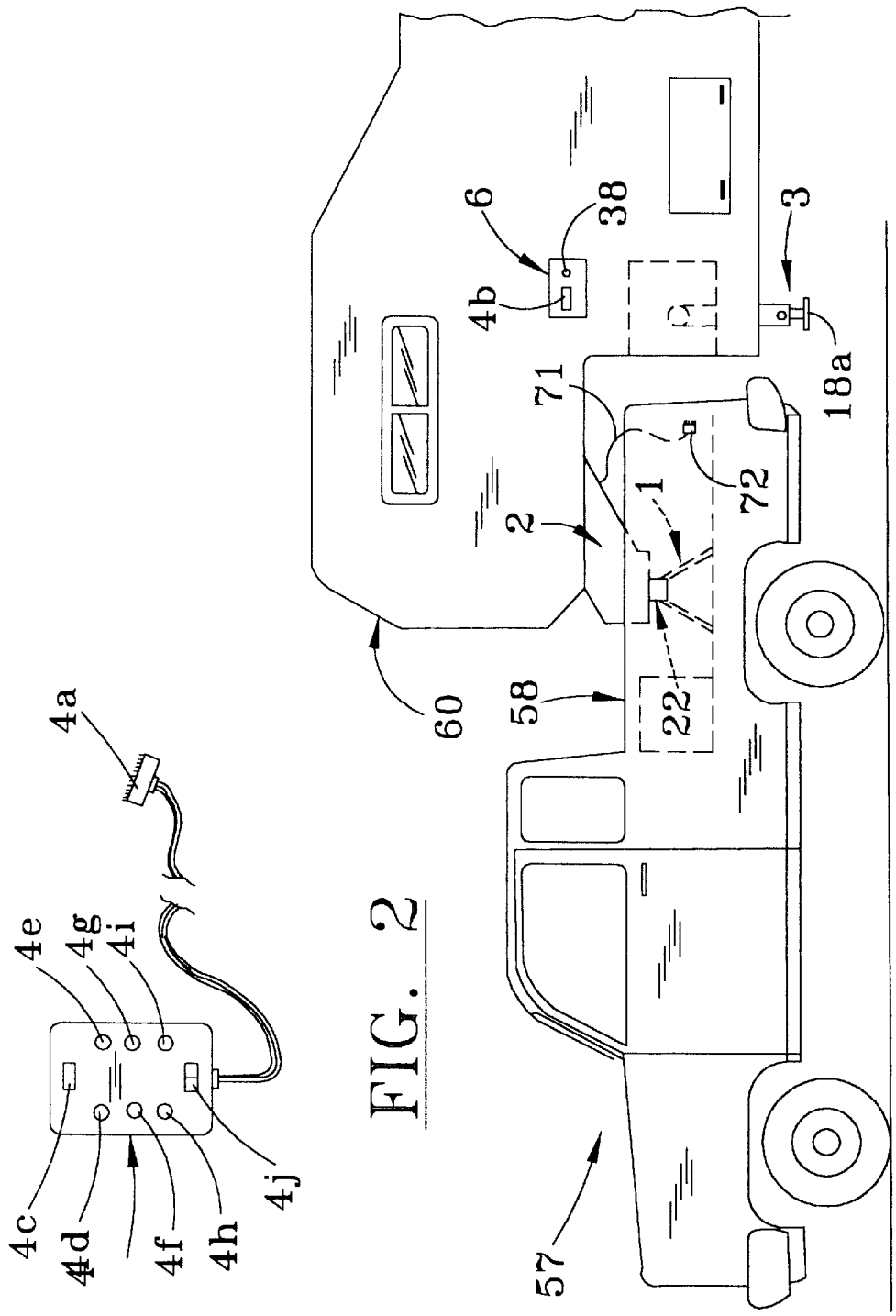

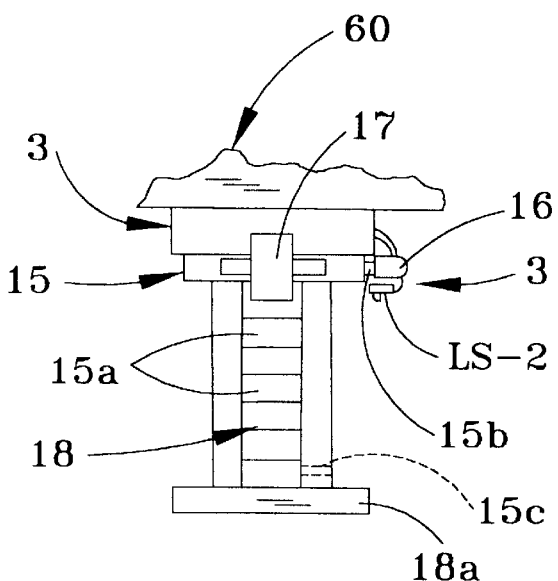
FIG. 6
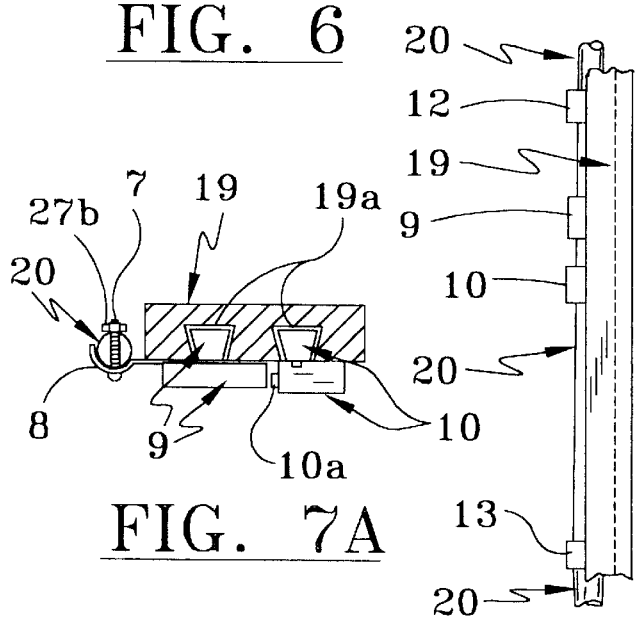
FIG. 7A
FIG. 7B
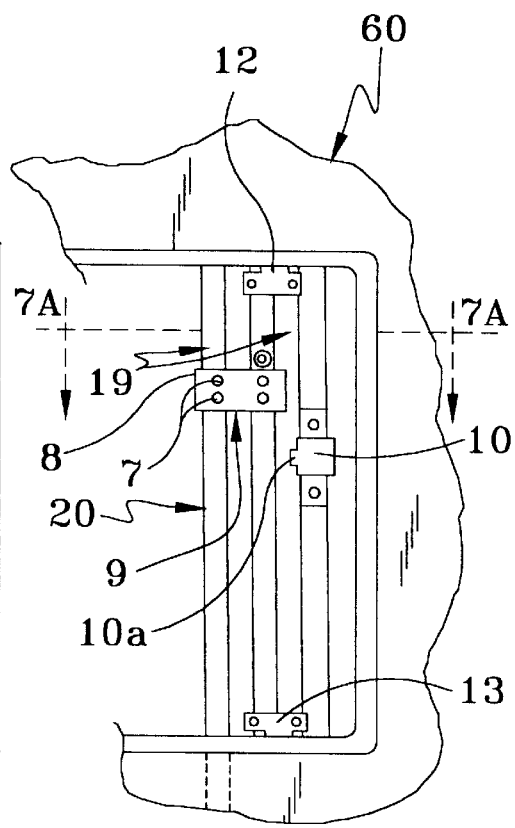
FIG. 7
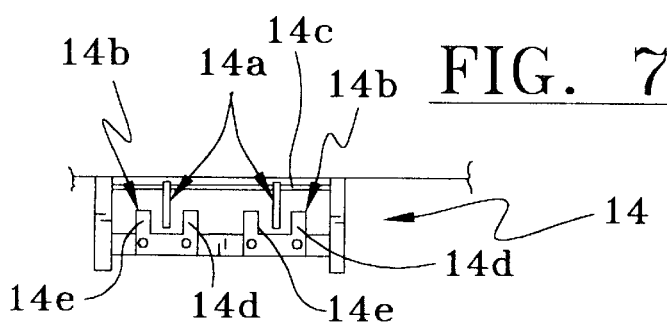
FIG. 8

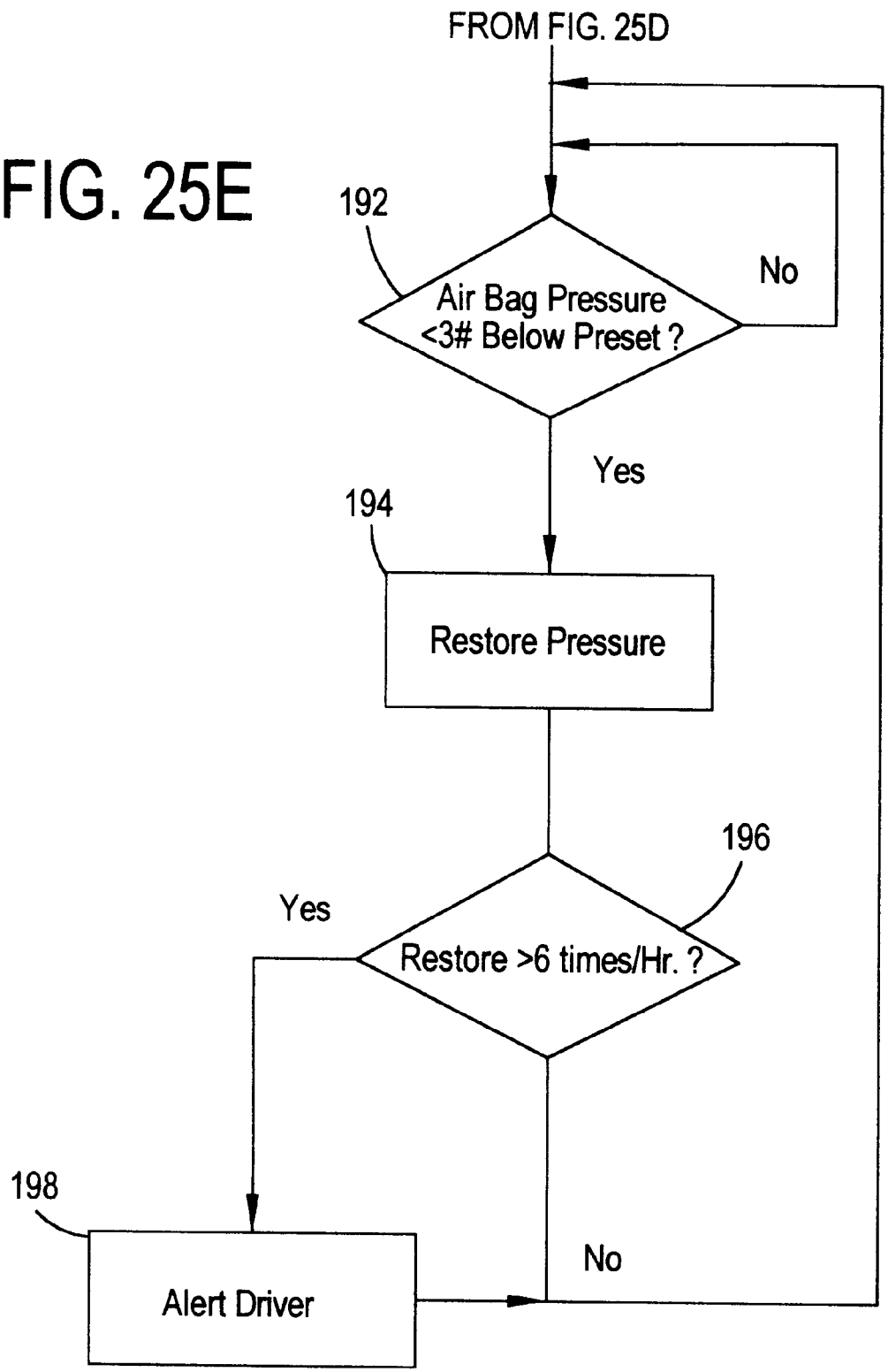

AUTOMATIC FIFTH WHEEL LOADING AND UNLOADING SYSTEM

CROSS-REFERENCE TO RELATED APPLICATIONS

This application claims the benefit of copending U.S. Provisional Application Ser. No. 60/033,098, filed Dec. 17, 1996.

BACKGROUND OF THE INVENTION

1. Field of the Invention

This invention relates to leveling systems for recreational vehicles and more particularly, to an automatic fifth wheel disconnect, leveling and recoupling or loading system which is designed to automatically disconnect a trailer from a towing vehicle such as a pickup truck and level the trailer, as well as prepare the trailer for reconnection to the towing vehicle. In a preferred embodiment the automatic fifth wheel loading and unloading system is fitted with infrared circuits designed to facilitate proper clearance between the trailer coupling mechanism and the fifth wheel receiving mechanism on the towing vehicle and properly level the trailer after the trailer is uncoupled from the towing vehicle. The automatic fifth wheel loading and unloading system is operated by means of a "pigtail" control box or a control system located in the cab of the towing vehicle, which control box may be connected to the control circuitry in the system, either in the cab of the truck for use during inclement weather or in a control compartment located in the trailer. In a first preferred embodiment the control box is fitted with two toggle switches and six push buttons, which facilitate uncoupling the trailer from a fifth wheel coupling mechanism, typically provided in the bed of a pickup truck, leveling the trailer and recoupling the trailer in due course. The uncoupling process includes initially raising the trailer to a sufficient infrared beam-monitored height to provide a desired clearance between the coupling mechanism and the fifth wheel, unlocking the fifth wheel locking mechanism, operating the fifth wheel release mechanism to release the trailer coupler and leveling the trailer after the pickup truck has been removed from beneath the coupling mechanism of the trailer. The memory circuit also functions to again raise the coupling mechanism of the trailer to the uncoupling level for the purpose of recoupling the trailer coupling mechanism to the fifth wheel and recoupling of the coupling mechanism to the fifth wheel.

A first infrared circuit is provided on the fifth wheel mechanism to insure proper clearance between the trailer coupling mechanism and the fifth wheel during the uncoupling procedure. A second infrared circuit is provided in cooperation with a pair of pendulums pivotally mounted on a pendulum rod located in the trailer to facilitate accurate automatic leveling of the trailer by operation of the control box. A green light provided on the fifth wheel hitch mechanism indicates that the power on the automatic elements of the system are deactivated and the trailer and towing vehicle are ready for travel. A red light indicates that the hitch is not locked and the system is therefore not secure.

In a second preferred embodiment of the invention a system of air bags and infrared circuits is provided for side-to-side leveling of the trailer and front-to-rear leveling is accomplished by means of extensible front and rear legs, all operated by a micro-controller. The hitch mechanism is essentially the same as described above with respect to the first embodiment of the invention and is also operated by the micro-controller.

2. Description of the Prior Art

One of the problems realized in coupling and uncoupling gooseneck-type trailers from fifth wheel hitch mechanisms typically located in the bed of a pickup truck, is that of use of a manual, spring-loaded switch which drives the legs of the trailer up or down and is controlled by the operator while viewing the trailer coupling mechanism in relationship to the position of the fifth wheel hitch mechanism. Accordingly, the operator must position himself to view the clearance between the fifth wheel hitch mechanism and the trailer coupling mechanism in order to control the raising and lowering motor located in the trailer. In a second step, while viewing the respective positions of the level indicators on the trailer, the trailer must be manually raised or lowered to the level position by operating the same switch motor. Accordingly, the leveling procedure becomes quite tedious under circumstances where the trailer is located on uneven ground and the same procedure must be repeated under circumstances where the trailer is to be recoupled to the truck or towing vehicle. The entire process, including both the coupling and uncoupling procedure, involves much trial and error, with the expenditure of considerable time and great care must be taken not to damage the extending and retracting legs located on the trailer by excessively extending or retracting them.

It is an object of this invention to provide a new and improved automatic fifth wheel loading and unloading system which is capable of automatically disconnecting the trailer coupling mechanism of a gooseneck-type travel trailer from the fifth wheel hitch mechanism located in a towing vehicle such as a pickup truck.

Another object of the invention is to provide a fifth wheel connect-disconnect mechanism which is capable of automatically disconnecting the gooseneck coupling element from a fifth wheel hitch mechanism by monitoring the disconnect clearance using an infrared circuit and thereby insuring proper clearance between the coupling mechanism and the hitch mechanism at all times during the connect-disconnect procedures.

A still further object of the invention is to provide a new and improved automatic fifth wheel loading and unloading system for disconnecting the gooseneck-type coupling mechanism from a fifth wheel hitch located in the bed of a pickup truck using a first infrared sensing system, automatically leveling the trailer after the disconnect procedure using an infrared positioning system, automatically positioning the trailer for reconnecting to the towing vehicle in due course and automatically lowering the trailer to again engage the gooseneck-type connecting mechanism with the fifth wheel trailer hitch.

A still further object of the invention is to provide a new and improved mechanism for disconnecting a trailer from a hitch mechanism in a pickup truck or alternative towing vehicle using a master micro-controller and an infrared beam-monitoring system. The clearance between the trailer connecting mechanism and the hitch mechanism is monitored and the trailer automatically leveled from side-to-side by means of a pair of pendulums in a leveling switch and an infrared circuit provided in cooperation with the pendulums. The trailer coupling mechanism is raised to clear the pickup truck and the trailer leveled from front-to-rear, after which the trailer is again raised to a recoupling height using a memory circuit and automatically recoupled to the towing vehicle.

Another object of this invention is to provide an automatic fifth wheel system for unloading, leveling and reloading a gooseneck-type trailer on a fifth wheel hitch located in the bed of a pickup truck, which device includes an infrared sensing device for monitoring the clearance between the trailer coupling mechanism and the hitch mechanism, infrared positioning devices provided in cooperation with air bags and leveling pendulums located in the trailer for automatically leveling the trailer from side-to-side and front-to-rear before the trailer is uncoupled from the truck.

SUMMARY OF THE INVENTION

These and other objects of the invention are provided in a new and improved automatic fifth wheel loading and unloading system which is applicable to gooseneck-type recreational vehicle trailers coupled to fifth wheel hitch mechanisms located in the beds of pickup trucks or other carriers. In a first preferred embodiment the automatic fifth wheel loading system is characterized by a system of air cylinders provided on the hitch mechanism in cooperation with a first infrared circuit for effecting automatic monitoring, unlocking and disengagement of the trailer coupling mechanism with the fifth wheel hitch device during the uncoupling stage. The system is further designed to automatically level the trailer by operation of a push button located in a control box utilizing a pair of pendulums spaced on a pendulum rod and fitted with a second infrared circuit for determining when the pendulums are properly aligned and the trailer is therefore in a level position. The automatic fifth wheel loading and unloading system is further designed to automatically reposition the trailer in loading configuration with the trailer coupling mechanism raised to a selected height by operation of a memory circuit, in order to accommodate the fifth wheel hitch device as the pickup truck is backed beneath the trailer coupling mechanism and to automatically lower the trailer coupling mechanism into the fifth wheel hitch device and monitor the coupling by means of the first infrared circuit. Red and green lights provided on the hitch mechanism are designed to advise the operator as to secure or unsecure coupling of the trailer coupling mechanism to the fifth wheel hitch device.

In a second preferred embodiment of the invention, the coupling and uncoupling procedures are electronically orchestrated by a master micro-controller, which initially levels the trailer from side-to-side using air bags and infrared pendulum switches in cooperation with solenoid valves and an air tank. Uncoupling of the trailer is also effected by the master micro-controller, along with front-to-rear leveling using infrared pendulum switches and retractable, electric motor-driven legs monitored by limit switches.

The invention will be better understood by reference to the accompanying drawings, wherein:

FIG. 1 is a side view, partially in section, of a pickup truck having a fifth wheel-type hitch mechanism in the bed thereof and coupled to the gooseneck coupling mechanism of a trailer, with the trailer in towing configuration;

FIG. 2 is a top view of a typical control box fitted with a control box plug for effecting orchestration of the various trailer uncoupling, trailer leveling and trailer recoupling modes of the automatic fifth wheel loading system;

FIG. 6 is a front view, partially in section, of a typical trailer landing gear configuration in the first embodiment of this invention, more particularly illustrating the manual leg extension and motor-operated leg extension elements thereof;

FIG. 7 is a front view, partially in section, of a memory mechanism located in the trailer illustrated in FIGS. 1 and 5, more particularly illustrating a backboard, upon which is mounted a feedback bar, a movable leg travel feedback actuator and a memory switch, to effect recoupling of the trailer in the first embodiment of the invention;

FIG. 7A is a sectional view taken along line 7A—7A, of the memory apparatus illustrated in FIG. 7;

FIG. 7B is a side view of the memory mechanism illustrated in FIG. 7;

FIG. 8 is a top view of a typical pendulum system and cooperating infrared circuit apparatus for automatic leveling of the trailer;

DESCRIPTION OF THE PREFERRED EMBODIMENTS

Figure 3:
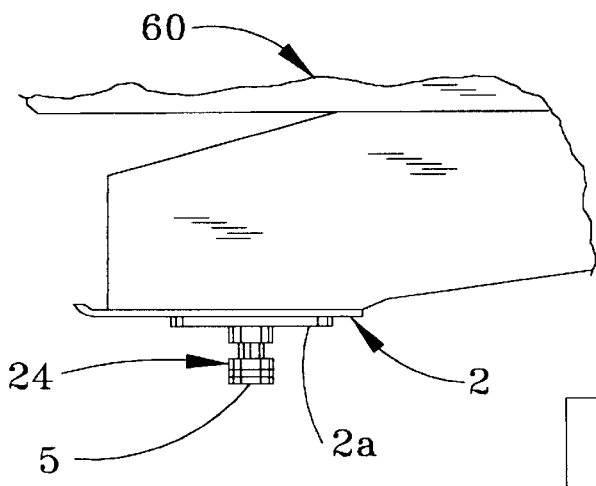
FIG. 3 is a side view, partially in section, of the hitch arm and pin apparatus of the trailer, more particularly detailing coupling details of the arm and pin.

Referring initially to FIGS. 1, 2, 5 and 6 of the drawings, in a first preferred embodiment, the automatic fifth wheel loading and unloading system of this invention is designed to operate in the coupling and uncoupling of a trailer 60 to and from a pickup truck 57 in the following manner. The pickup truck 57 typically includes a truck bed 58 fitted with a hitch stand 1, illustrated in phantom, and the trailer 60 includes a hitch arm and pin apparatus 2, typically known as a "gooseneck" coupling mechanism which interacts with and couples to a fifth wheel 22, also illustrated in phantom and mounted on the hitch stand 1. A pair of trailer landing gears 3 are provided on the front portion of the trailer 60 for supporting the trailer 60 when the trailer 60 is uncoupled from the pickup truck 57, as hereinafter further described. Leg extension pads 18a, commonly called "landing pads" are provided on the bottom of each of the trailer landing gears 3 for contacting the ground, as further hereinafter described. A control compartment 6 is provided in one side of the trailer 60 and includes a conventional control switch 38, as well as a plug receptacle 4b for receiving the control box plug 4a of a control box 4 illustrated in FIG. 2 and operating the automatic fifth wheel loading system of this invention, as hereinafter described. A trailer power cable 71 extends from the hitch arm and pin 2 of the trailer 60 and terminates in a cable plug 72, for attachment to a corresponding truck power cable 70, fitted with a mating receiving cable plug 72, to facilitate transmission of power from the pickup truck 57 to the trailer 60 for operation of the automatic fifth wheel loading system. As illustrated in FIG. 2 of the drawings, the control box 4 is fitted with multiple switches and push buttons 4c, 4d, 4e, 4f, 4g, 4h, 4i and 4j, which are utilized to operate the automatic fifth wheel loading system, as hereinafter described.

Figure 4:
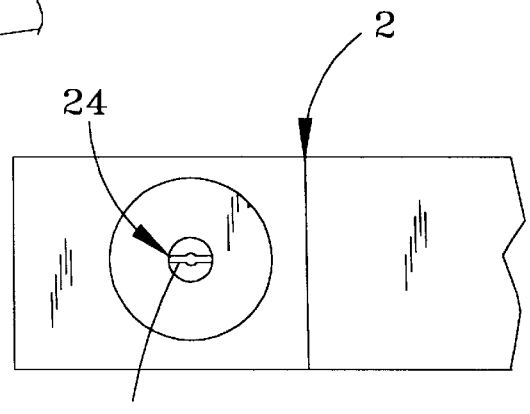
FIG. 4 is a bottom view of the hitch arm and pin apparatus illustrated in FIG. 3.

Referring now to FIGS. 3 and 4 of the drawings, the hitch arm and pin 2 further include a hitch pin apparatus which terminates in an infrared switch plate 5, that serves to selectively and periodically interrupt an infrared beam (not illustrated) to facilitate a determination of proper clearance between the hitch pin 24 and the locking mechanism of the fifth wheel 22, as hereinafter further described. Accordingly, it will be appreciated by those skilled in the art that the determination of this proper clearance between the hitch pin 24 and the locking mechanism of the fifth wheel 22 is of primary importance in the coupling and uncoupling procedures of the invention.

Figure 5:
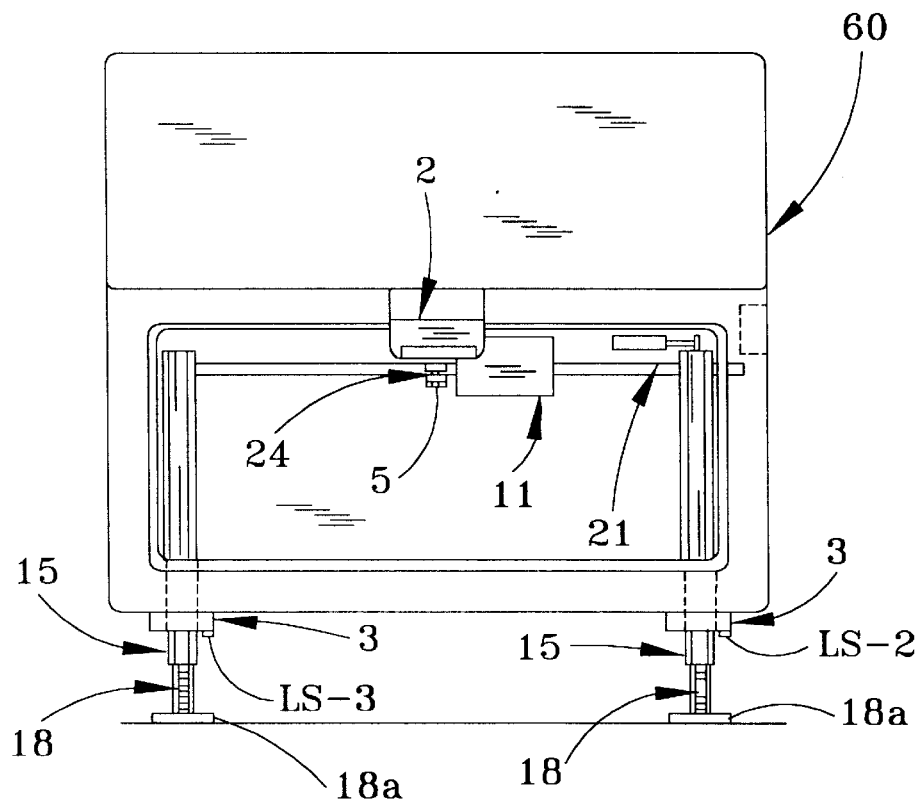
FIG. 5 is a front view of the trailer illustrated in FIG. 1 after the trailer has been uncoupled from the pickup truck.

Referring again to FIGS. 1, 5 and 6 of the drawings, each trailer landing gear 3 further includes a motor-operated leg extension 15, which selectively extends into and retracts from the bottom of the trailer 60 and is operated by a conventional leg extension apparatus, conventionally operated by the conventional control switch 38 and generally illustrated by reference numeral 21 in FIG. 5. Accordingly, as illustrated in FIGS. 1 and 5, under circumstances where the conventional control switch 38 is used to uncouple, level and recouple the trailer 60 in conventional fashion, the trailer landing gears 15 extend and retract in concert from the trailer 60 responsive to operation of the conventional leg extension apparatus 21. A manual leg extension 18 is telescopically fitted to each of the motor-operated leg extensions 15, as further illustrated in FIGS. 5 and 6 and multiple, spaced-apart leg extension slots 15a are provided in each of the manual leg extensions 18 for periodic engagement by a pivotal, spring-loaded jack latch 17, further illustrated in FIG. 6. Accordingly, extension of each of the manual leg extensions 18 by gravity from the corresponding motor-operated leg extension 15 effects sequential engagement of the corresponding jack latch 17 with the respective manual leg extension 18, and the manual leg extensions 18 are prevented from inadvertently retracting back into the corresponding motor-operated leg extension 15 by engagement of the jack latch 17 with the respective leg extension slots 15a. The respective jack latches 17 thus serve as an automatic stop to facilitate gravity-extension of the manual leg extensions 18 in concert from the respective motor-operated leg extensions 15 and to prevent undesirable retraction of the manual leg extensions 18 back into the corresponding motor-operated leg extensions 15. Retraction of the manual leg extensions 18 back into the corresponding motor-operated leg extensions 15 is facilitated by manually manipulating the jack latches 17 against the spring bias and releasing the jack latches from the respective leg exit slots 15a.

Figure 14:
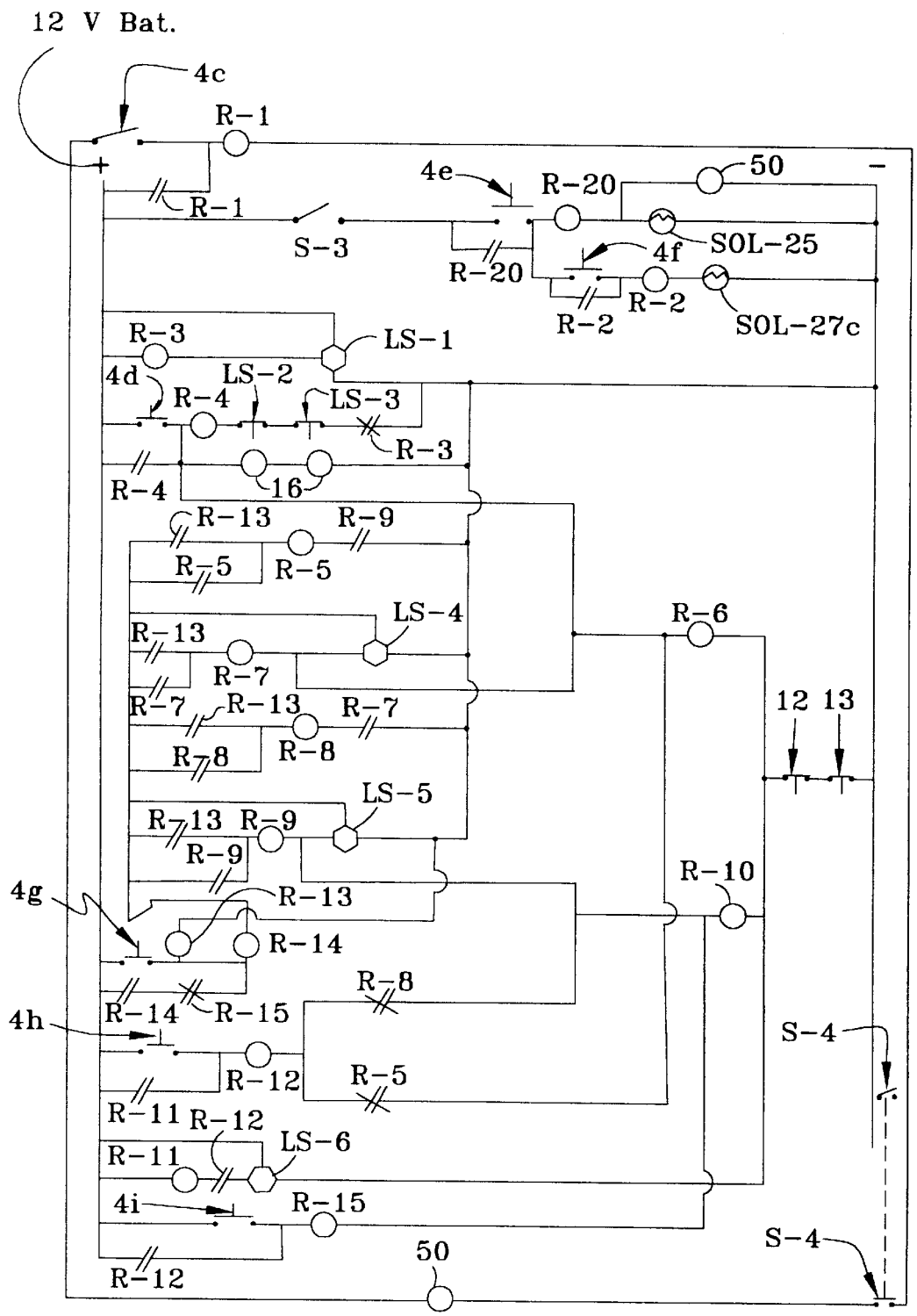
FIG. 14 is a schematic of the operational relay and switch components of the first embodiment of the automatic fifth wheel loading system.

A magnetic coil 16 is attached to each of the motor-operated leg extensions 15, respectively. The magnetic coils 16, one of which is illustrated in FIG. 6, are each fitted with a leg extension pin 15b, also illustrated in FIG. 6, which extends through the corresponding motor-operated leg extension 15 and into the adjacent pin receptacle 15c of the matching manual leg extension 18 when the manual leg extensions 18 are fully retracted inside the corresponding motor-operated leg extension 15. Furthermore, also under circumstances where the manual leg extensions 18 are fully retracted inside the corresponding motor-operated leg extension 15, the respective leg extension pads 18a contact the corresponding safety limit switches LS-2 and LS-3 attached to the magnetic coil 16, as illustrated in FIGS. 6 and 14. The safety limit switches LS-2 and LS-3 facilitate overriding operation of the automatic fifth wheel loading system under circumstances where only one of the manual leg extensions 18 extends by gravity in the system due to system malfunction. Accordingly, this safety mechanism is designed to prevent toppling of the trailer under circumstances where one of the manual leg extensions 18 fails to operate due to a malfunction of the trailer landing gear apparatus.

Figure 10:
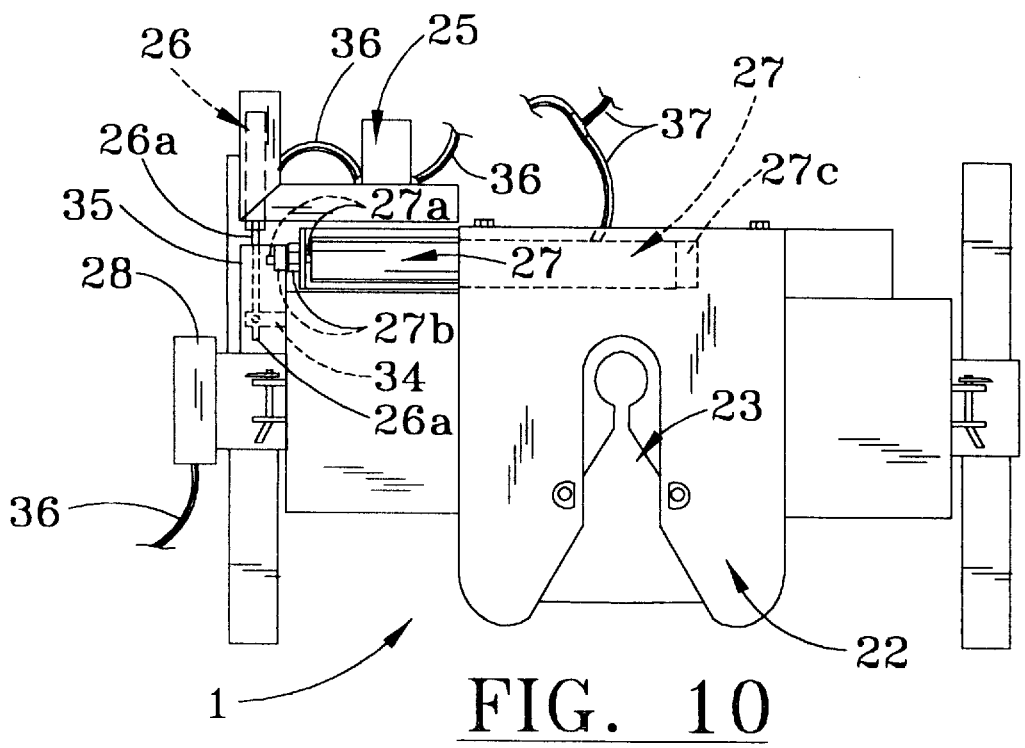
FIG. 10 is a top view of a typical hitch stand and fifth wheel hitch apparatus mounted in the bed of the pickup truck illustrated in FIG. 1 in the first embodiment of the invention.
Figure 11:
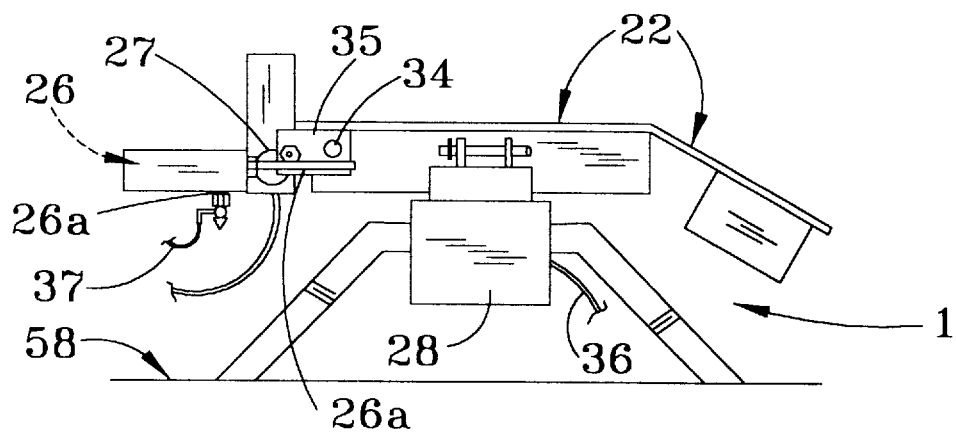
FIG. 11 is a side view of the hitch stand and fifth wheel hitch apparatus illustrated in FIG. 10.
Figure 10A:
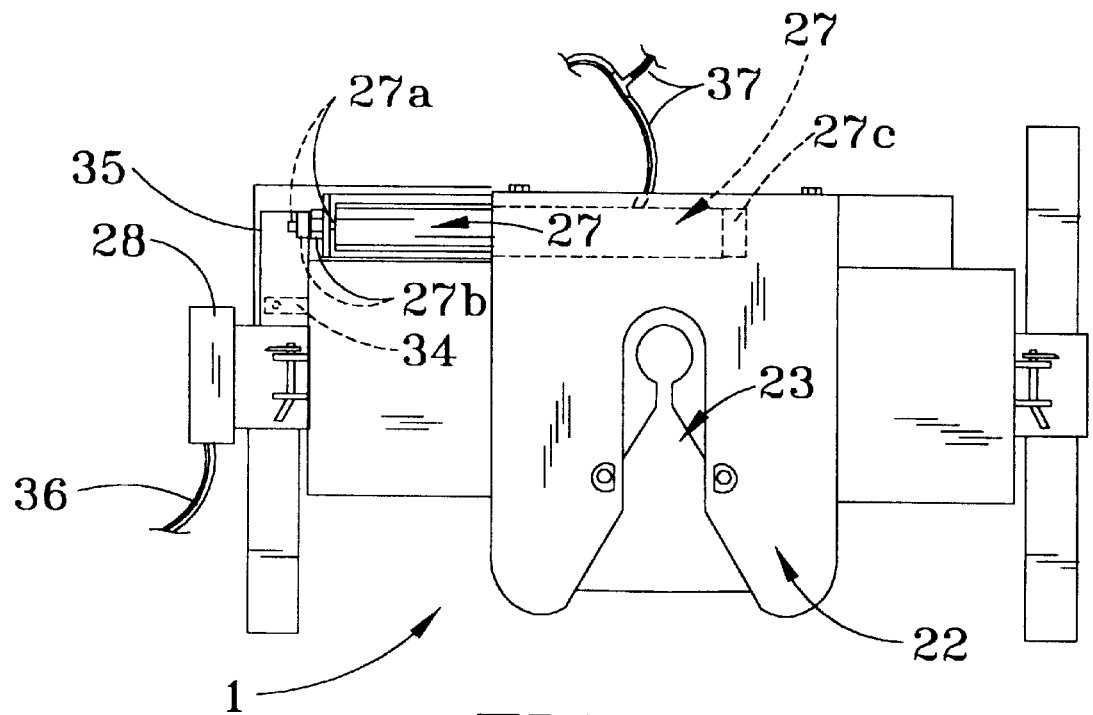
FIG. 10A is a top view of the fifth wheel hitch apparatus illustrated in FIG. 10, more particularly illustrating omission of the lock cylinder 26 in the second embodiment of the invention.
Figure 11A:
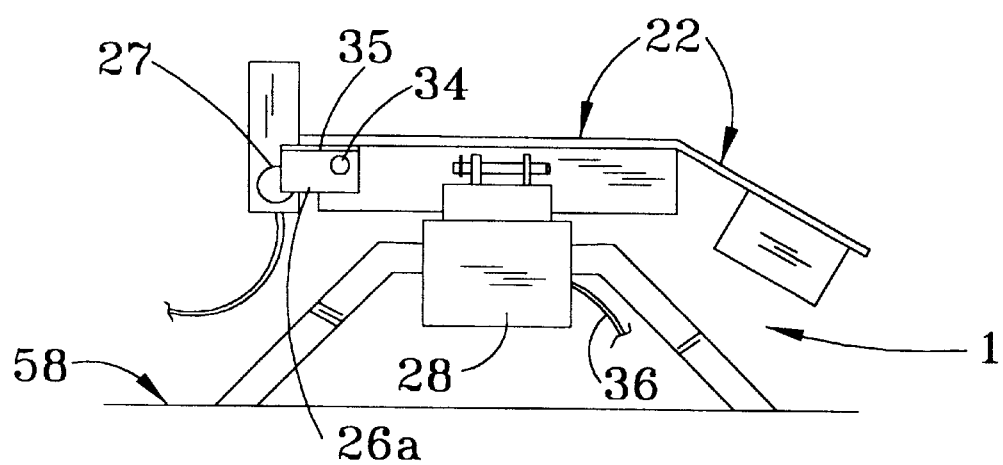
FIG. 11A is a side view of the hitch stand and fifth wheel apparatus illustrated in FIGS. 10A and 11, more particularly illustrating omission of the lock cylinder 26.

Referring now to FIGS. 10–13 of the drawings, the conventional hitch arm and pin 2 and fifth wheel 22 have been modified to accommodate the elements of this invention, as follows. The fifth wheel 22 is characterized by a conventional spring-loaded hitch yoke 23, which is designed to engage and lock the hitch pin 24 extending from the hitch arm and pin 2 illustrated in FIGS. 3 and 4 of the drawings. A hitch opening cylinder 27 is mounted on the hitch stand 1 and the hitch opening cylinder piston 27a of the hitch opening cylinder 27 is provided with a pair of nuts 27b for mounting an arm plate 35, connected to a hitch opening arm 34. The hitch opening arm 34, illustrated in FIG. 11 and in phantom in FIG. 10, is further attached to the spring-loaded hitch yoke 23. The cylinder piston 26a of a lock cylinder 26, also mounted on the hitch stand 1, blocks extension of the hitch opening cylinder piston 27a and the arm plate 35. An electric solenoid 25 is also attached to the hitch stand 21 adjacent to the lock cylinder 26 and is electrically connected to the lock cylinder 26 by means of wiring 36. A solenoid relay control box 28 is further mounted on the hitch stand 1 for purposes which will be hereinafter further described.

Figure 13:
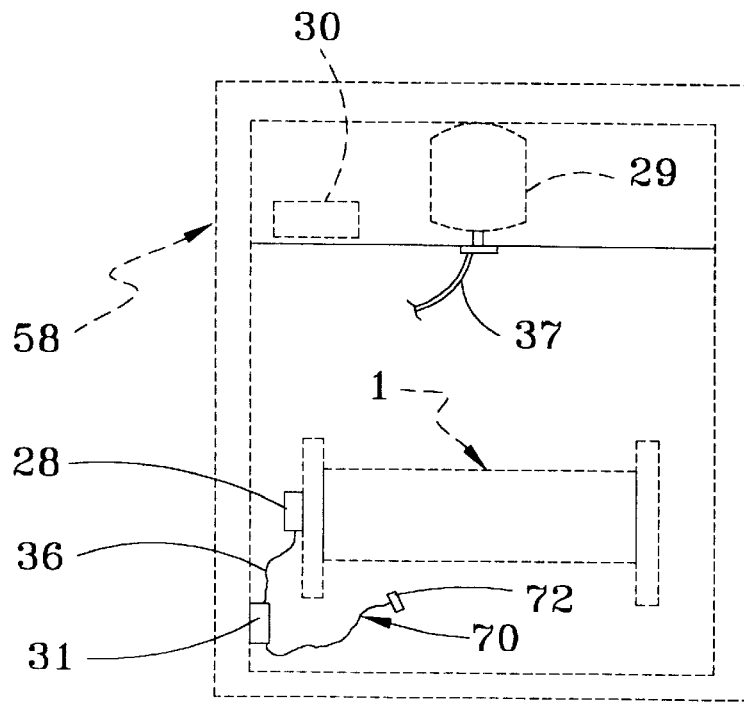
FIG. 13 is a top view of the pickup truck bed and the hitch stand and fifth wheel apparatus, as well as a typical air tank and air compressor arrangement, all illustrated in phantom and provided in the pickup truck illustrated in FIG. 1.

As further illustrated in phantom in FIG. 13, an air tank 29 is provided in the truck bed 58 of the pickup truck 57 and is attached to an air compressor 30 by means of air hose 37, in order to maintain a selected pressure in the air tank 29. A terminal box 31 is also provided in the truck bed 58 of the pickup truck 57 for receiving the truck power cable 70, which terminates in a cable plug 72 that matches the cable plug 72 on the trailer power cable 71 illustrated in FIG. 1, as heretofore described. The solenoid relay control box 28 is connected to the terminal box 31 by means of wiring 36, as further illustrated in FIG. 13.

Referring again to FIG. 12 of the drawings, an infrared emitter 32 and an infrared receiver 32a are mounted in spaced-apart, facing relationship in the hitch stand 1 beneath the fifth wheel 22 and the hitch yoke 23 and both face the infrared switch plate 5 mounted on the hitch pin 24 when the hitch arm and pin 2 is connected to the fifth wheel 22 in towing configuration as illustrated in FIG. 1. The infrared emitter 32 and infrared receiver 32a operate to aid in the trailer uncoupling procedure, as hereinafter described.

Referring now to FIGS. 7–7B of the drawings, the memory feature provided in the trailer 60 includes a backboard 19, which is mounted in the trailer 60 and is fitted with a feedback bar 20, vertically oriented beside the backboard 19 and attached to the backboard 19 by means of an actuator bracket 8 and bracket bolts 7 and nuts 27b, as illustrated in FIGS. 7 and 7A. The backboard 19 is further fitted with a pair of dove-tail backboard slots 19a, as further illustrated in FIG. 7A for receiving a corresponding leg travel feed back actuator 9 and a memory switch 10, each further provided with a dove-tail projection which slidably mounts in a corresponding one of the matching backboard slots 19a. Accordingly, it will be appreciated from a consideration of FIGS. 7 and 7a that both the leg travel feedback actuator 9 and the memory switch 10 slidably and vertically traverse the respective leg extension slots 15a in vertically-spaced relationship, as hereinafter described. A top limit switch 12 is fixed to the top of the backboard 19 in the path of the leg travel feedback actuator 9 and a bottom limit switch 13 is similarly mounted on the bottom edge of the backboard 19, also in the path of the leg travel feedback actuator 9. The memory switch 10 is further designed to contact the leg travel feedback actuator 9 when the two devices pass each other in their respective up and down travel in the corresponding backboard slots 19a, as further illustrated in FIGS. 7 and 7a.

Figure 9:
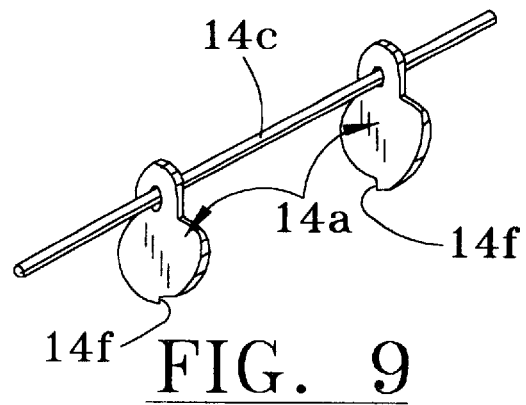
FIG. 9 is a perspective view of a typical pendulum and pendulum rod arrangement in the leveling switch mechanism illustrated in FIG. 8.

Referring now to FIGS. 5, 8 and 9 of the drawings, and initially to FIG. 5, a relay control box 11 is provided in the trailer 60 for housing the relays R1–15, illustrated in FIG. 14. A level switch mechanism is also generally illustrated by reference numeral 14 in FIGS. 8 and 9 and includes a pair of switch pendulums 14a, pivotally mounted on a pendulum rod 14c between the respective poles of a pair of slot switches 14b. Each of the slot switches 14b have an infrared emitter 14d on one end thereof and an infrared receiver 14e on the opposite end, with the bottom ends of the switch pendulums 14a extending in the slot defined between the respective pairs of infrared emitters 14d and infrared receivers 14e. Accordingly, it will be appreciated from a consideration of FIGS. 8 and 9 that the switch pendulums 14a are able to independently pivot on the common carrying pendulum rod 14c between the respective pairs of infrared emitters 14d and infrared receivers 14e. Each of the switch pendulums 14a has a pendulum shoulder 14f which is oppositely disposed on the bottom ends of the switch pendulums 14a, respectively, as further illustrated in FIG. 9. The infrared emitters 14d and infrared receivers 14e are aligned in the respective slot switches 14b to coincide with the respective pendulum shoulders 14f when the trailer 60 is level. Accordingly, the infrared beams extending between the infrared emitters 14d and infrared receivers 14e, respectively, will normally pass through the openings adjacent to the respective pendulum shoulders 14f when the trailer 60 is not level and the switch pendulums 14a are pivoted off-center from a directly downwardly-extending position. However, the infrared beams will be interrupted under circumstances where the switch pendulums 14a are suspended directly downwardly by gravity, since the pendulum shoulders 14f interrupt the infrared beams when the trailer 60 is level, as further hereinafter described.

Referring again to FIG. 2 of the drawings, as further heretofore described, the control box plug 4a of the control box 4 may be plugged into either a corresponding plug (not illustrated) provided in the cab of the pickup truck 57 or into the plug receptacle 4b, located in the control compartment 6 of the trailer 60. Accordingly, operation of the first preferred embodiment of the automatic fifth wheel loading system of this invention upon arrival at a campsite is described with respect to the drawings and the relay and switch schematic illustrated in FIG. 14 in particular, as follows: When it is desired to uncouple the trailer 60 from the pickup truck 57 and level the trailer 60 by operation of the automatic fifth wheel loading system of this invention, the control box plug 4a is first plugged into the corresponding receptacle (not illustrated) provided in the cab of the pickup truck 57, if the weather is inclement, or alternatively, into the plug receptacle 4b located in the control compartment 6 of the trailer 60. When this is accomplished, and referring again to the drawings and FIG. 14 in particular, the control switch S-4, located in the control compartment 6, is closed, thus enabling automatic operation of the automatic fifth wheel loading system. The power toggle switch 4c is then depressed, thus applying power to relay R-1, closing the normally-open contacts and energizing the system, as illustrated in FIG. 14. The disconnect push button 4d on the control box 4 is then depressed and this action energizes relay R-4 through the safety limit switches LS-2 and LS-3, located on the motor-operated leg extensions 15, and the normally closed contacts in relay R-3. The magnetic coils 16, also located on the respective motor-operated leg extensions 15, then retract the corresponding leg extension pins 15b that normally register with the pin receptacles 15c in the manual leg extensions 18, respectively, and normally retain the manual leg extensions 18 in the upright or retracted position. When the leg extension pins 15b are so retracted, the manual leg extensions 18 are allowed to fall by gravity to the point where the respective leg extension pads 18a contact the ground. When the manual leg extensions 18 fall to this position, they close the normally-open contacts in the respective safety limit switches LS-2 and LS-3, illustrated in FIGS. 5 and 6. If one or both of the manual leg extensions 18 fail to fall through malfunction of the trailer landing gear mechanism 3, the safety limit switches LS-2 and LS-3 will not close, relay R-4 will not be energized and further operation of the automatic fifth wheel loading system will not be facilitated until the deficiency is corrected. As the manual leg extensions 18 fully extend such that the leg extension pads 18a touch the ground, they close the normally-open contacts on the safety limit switches LS-2 and LS-3. Furthermore, the internally spring-biased jack latches 17 automatically engage a corresponding leg extensions slot 15a in each of the manual leg extensions 18, to support the trailer 60 in that position. When the manual leg extensions 18 fully extend and relay R-4 is energized, the motor-controlled relay R-6 in the relay control box 11 is also energized through the top limit switch 12 and bottom limit switch 13, illustrated in FIG. 7. This allows the conventional leg extension apparatus 21 to continue to operate and drive the motor-operated leg extensions 15 in concert, monitored by the top limit switch 12 and bottom limit switch 13.

Figure 12:
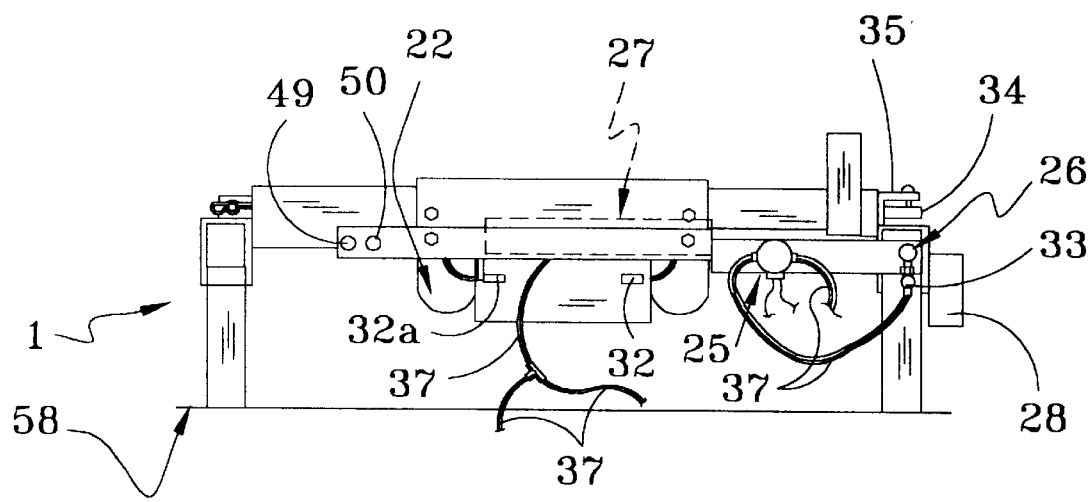
FIG. 12 is a front view of the hitch stand and fifth wheel hitch apparatus illustrated in FIGS. 10 and 11.

As the front end of the trailer 60 rises to a position such that the hitch arm and pin 2 is approximately 1/8 of an inch above the hitch yoke 23 of the fifth wheel 22, the infrared switch plate 5 is elevated above the beam emitted by the infrared emitter 32 and received by the infrared receiver 32a mounted on the fifth wheel 22, as illustrated in FIG. 12. This condition closes relay R-3, thus opening the circuit which further opens relay R-4, as illustrated in FIG. 14. The condition further terminates operation of the leg extension apparatus 21 and removes power from the coil 16, thus allowing the spring-loaded leg extension pins 15b to depress against the manual leg extensions 18 due to the bias in the leg extension pins 15b. At this point, the position of the memory switch 10 is manually set by releasing the lock (not illustrated), sliding the memory switch 10 on the backboard 19 until the actuator 10a touches the leg travel feedback actuator 9, illustrated in FIGS. 7 and 7a, and resetting the memory switch lock. This action pre-positions the trailer positioning mechanism for reloading and recoupling, as hereinafter further described.

Referring again to FIG. 14, the enabling toggle switch 4j on the control box 4 is then pressed to facilitate further operation of the first embodiment system in a three-step process; until the enabling toggle switch 4j is manipulated, no power is applied to the unlocking push button 4e or the hitch opening push button 4f. However, when the enabling toggle switch 4j is pressed, the unlocking push button 4e is then pressed to furnish power to the relay R-20 in the electric solenoid 25 and illuminate the red light 50. This action also closes the normally-open contact on the relay R-20 and maintains power in the operating circuit after the unlocking push button 4e is released. Energizing of the solenoid 25 also introduces air from the air tank 29 through the restrictor, or flow control valve 33, into the lock cylinder 26. This retracts the lock cylinder piston 26a and clears the hitch opening cylinder piston 27a of the hitch opening cylinder 27, which is then actuated by pressing the hitch opening push button 4f, locking in the relay R-2 and energizing the elastic solenoid 27c, illustrated in FIG. 10, to cause air to flow from the air tank 29 into the hitch opening cylinder 27, extend the hitch opening cylinder piston 27a and clear the spring-loaded hitch yoke 23 from contact with the hitch pin 24 to facilitate outward movement of the hitch pin 24 from the hitch yoke 23. The pickup truck 57 is then moved to misalign the hitch arm and pin 2 with the hitch yoke 23, with the cable plugs 72 still connected. Depression of the leveling push button 4g then causes the motor-operated leg extensions 15 to travel downwardly or upwardly in concert, depending upon leveling requirements, by operation of the conventional leg extension apparatus 21, which is monitored by the top limit switch 12 and bottom limit switch 13, as well as the leg travel feedback actuator 9. Since the feedback bar 20 in the memory mechanism illustrated in FIGS. 7–7B, is connected to the motor-operated leg extensions 15, the latter move in concert with the former. For example, movement of the leg travel feedback actuator 9 in a downward direction on the backboard 19 forces the feedback bar 20 and the corresponding motor-operated leg extensions 15 downwardly together to raise the front end of the trailer 60, and vice-versa.

Referring again to FIGS. 7–9 and 14 of the drawings, automatic leveling of the trailer 60 is effected by the pair of infrared slot switches 14b, more particularly illustrated in FIG. 8. Depending upon the relative position of the trailer 60 responsive to the positions of the manual leg extensions 18, one of the slot switches 14b will be activated and the other will not. Accordingly, when the leveling push button 4g is depressed, power will be furnished to the coils of relays R-13 and R-14, as illustrated in FIG. 14. This action causes relays R-14 and R-13 to close and relay R-14 will lock itself through its now closed, normally open contact. The normally closed contact of the relay R-15, with power furnished through relay R-14 to the four, normally open contacts of relay R-13, will be applied to the coils of relays R-5, R-7, R-8 and R-9. If limit switch LS-4 is activated, not allowing relay R-7 to pick up and lock in, it will not let relay R-6 activate. The normally-closed contact in relay R-7 will remain closed, thus allowing relay R-8 to energize and remain closed. The limit switch LS-5 will not be activated and this will allow relay R-9 to energize, thus remaining closed through its normally open contact and at the same time, opening its normally closed contact in series with relay R-5, thus preventing relay R-5 from being energized. This action also furnishes power to relay R-10, causing the motor-operated leg extensions 15 to drive upwardly and lowering the front end of the trailer 60 until limit switch LS-5 is activated. This event will occur when the trailer 60 is level. The function of relay R-8, which will stay energized, is to determine whether the front end of the trailer 60 will move up or down in the recoupling step. This action is instantaneously effected when the leveling push button 4g is depressed. As soon as the leveling push button 4g is released, relay R-13 will be de-energized, opening all four contacts to relays R-5, R-7, R-8 and R-9. Furthermore, only the contacts which remain closed, that is, relays R-8, R-9 and R-10, will remain energized until the limit switch LS-5 is activated, thus opening relays R-9 and R-10. This electrical condition is effected since the limit switch LS-5 was not activated. Had the limit switch LS-5 been activated and the limit switch LS-4 not been activated, then the same scenario would have occurred with relays R-5, R-6 and R-7, until the limit switch LS-4 was de-activated. Either relay R-5 or relay R-8 will stay activated until the last command to retract the motor-operated leg extensions 15 for travel is effected, thus causing relay R-15 to engage and opening the normally-closed contact in series with the relay R-14 coil and removing the power from all four relays, R-5, R-7, R-8 and R-9. This action positions the four relays R-5, R-7, R-8 and R-9 and limit switches LS-4 and LS-5 again to level the trailer on the next event of unhooking the trailer.

Referring again to FIG. 14, the re-connecting push button 4h is then depressed and power is furnished through relay R-12 and the normally-closed contacts of either relays R-8 to R-10 or R-5 to R-6, depending upon the direction of travel in the previous step, which causes the contacts of either relay R-8 or R-5 to open and be held open. When the re-connecting push button 4h is depressed, power is applied through the normally-open contact of relay R-11 and the normally open contact of relay R-12 is closed, thus allowing relay R-11 to be energized until the limit switch LS-6 is activated. When the limit switch LS-6 is activated, it opens the normally-open contacts of relay R-11 in series with the coil of relay R-12, thus deactivating relay R-12 and relay R-6 or relay R-10 when it has reached the position previously set in the uncoupling operation. This action orients the trailer 60 back into the original position with respect to the ground that it was in when it was uncoupled. The pickup truck 57 can then be re-positioned beneath the hitch arm and pin 2, such that the cable plug 72 of the truck power cable 70 and the trailer power cable 70 can be re-connected. The lock cylinder 26 is then visually inspected to confirm that the lock cylinder piston 26a is retracted into the open position and the trailer 60 may be operated to engage the hitch arm and pin 2 with the hitch yoke 23 as follows: The leg retracting push button 4i is depressed, thus energizing relays R-15 and R-10 and driving the motor-operated leg extensions 15 upwardly, to lower the hitch arm and pin 2. The relay R-15 is locked in through its normally-open contacts when the leg retracting push button 4i is released. The motor-driven leg extensions 15 will continue to drive upwardly until the top limit switch 12 is reached, thus terminating operation of the conventional leg extension apparatus 21. This action relieves the tension on the jack latches 17 located on each of the manual leg extensions 18, allowing an operator to manually grip the leg extension pin 15b and allowing the manual leg extensions 18 to be manually fully retracted inside the corresponding motor-operated leg extensions 15 until the corresponding leg extension pads 18a contact the respective safety switches 52. The leg extension pins 15b are then released and allowed to register with the corresponding pin receptacles 15c in each of the manual leg extensions 18, to retain the leg extensions 18 in full retraction inside the corresponding motor-operated leg extensions 15. The power is then terminated by depressing the power toggle switch 4c, which action illuminates the green light 49 and the control box plug 4a of the control box 4 is disconnected from the plug receptacle 4b in the control compartment 6 of the trailer 60 or from the appropriate connection (not illustrated) located in the cab of the pickup truck 57.

It will be appreciated by those skilled in the art that the automatic fifth wheel loading and unloading system of the first embodiment of this invention is characterized by great convenience and utility, in that it may be quickly and easily utilized to unlock and uncouple a gooseneck-type trailer from a towing vehicle and to automatically reposition the coupling mechanism for recoupling. Furthermore, under circumstances where equipment or power failure may cause the automatic fifth wheel loading system to be rendered inoperable, the conventional loading system, which is operated by means of the original control switch 38 located in the control compartment 6, may be utilized to operate the conventional leg extension apparatus 21 illustrated in FIG. 5 in conventional manner.

Figure 15:
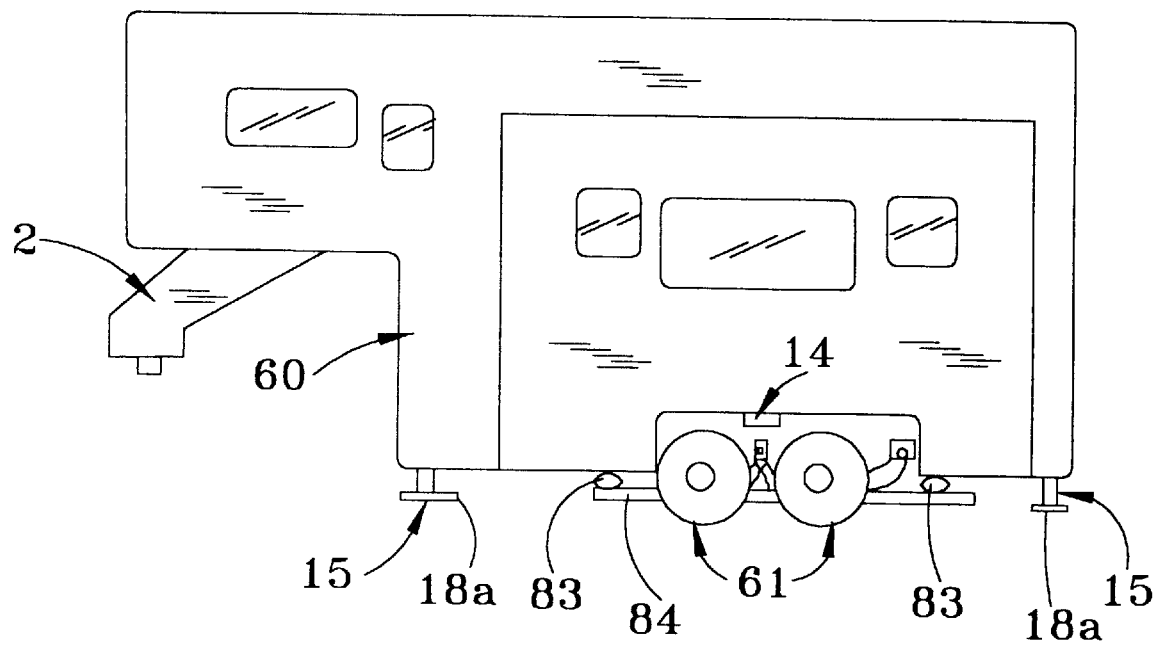
FIG. 15 is a side view of the trailer with dual sets of air bags in place in the second embodiment of the invention.
Figure 16:
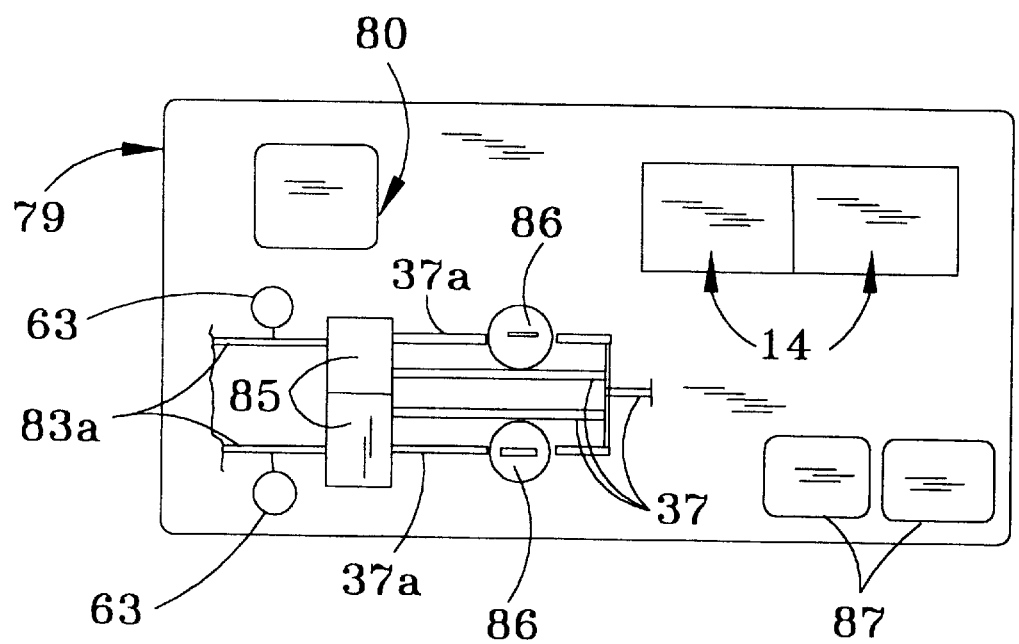
FIG. 16 is a top view of a component board provided in the second embodiment of the invention.
Figure 17:
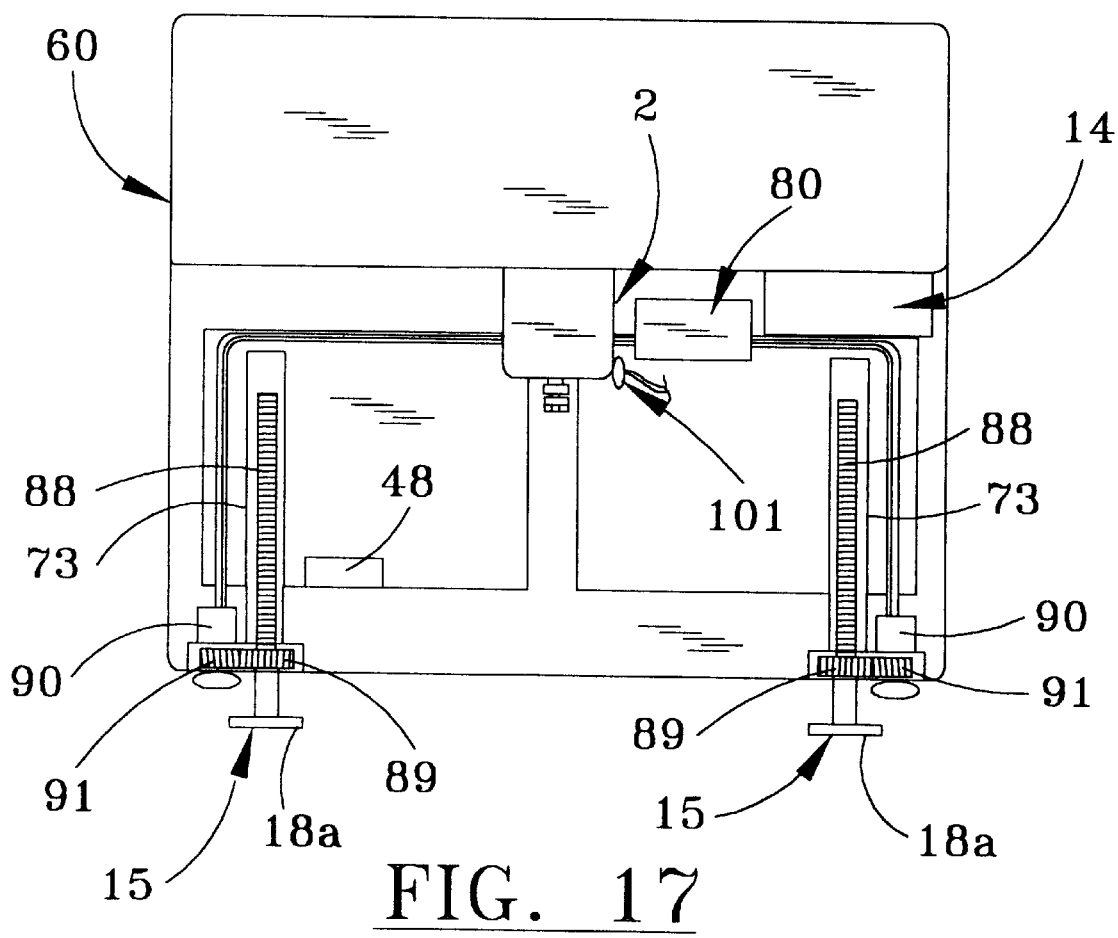
FIG. 17 is a sectional view of the trailer, more particularly illustrating a preferred leg extension leveling mechanism in the second embodiment of the invention.

In another preferred embodiment of the invention, operation of the automatic fifth wheel loading and unloading system is effected by means of a micro-controller which orchestrates various sensing and leveling modes in the trailer to effect the desired leveling of the trailer. Accordingly, as illustrated in FIGS. 15 and 16, a micro-controller 80 is provided on a component board 79, typically installed in the front of the trailer 60, and is shown in FIGS. 16 and 17. A pair of air bags 83 are mounted on a common air bag mount 84, provided on each side of the trailer 60 inwardly of the trailer wheels 61, as further illustrated in FIG. 15. Each cooperating set of air bags 83 is connected by means of an air bag service line 83a and air hoses 37a, to a pair of solenoid valves 85 and air regulators 86, and the air hoses 37 typically connect to a pressurized air reservoir or tank, such as the air tank 29, illustrated in FIG. 13, for selectively supplying air to the air bags 83, as illustrated in FIG. 16 and as hereinafter further described. A pair of pendulum-operated level switches 14, illustrated in FIGS. 8 and 9 of the drawings, are mounted in connection with each set of air bags 83 in the trailer 60, as further illustrated in FIG. 15.

Figure 18:
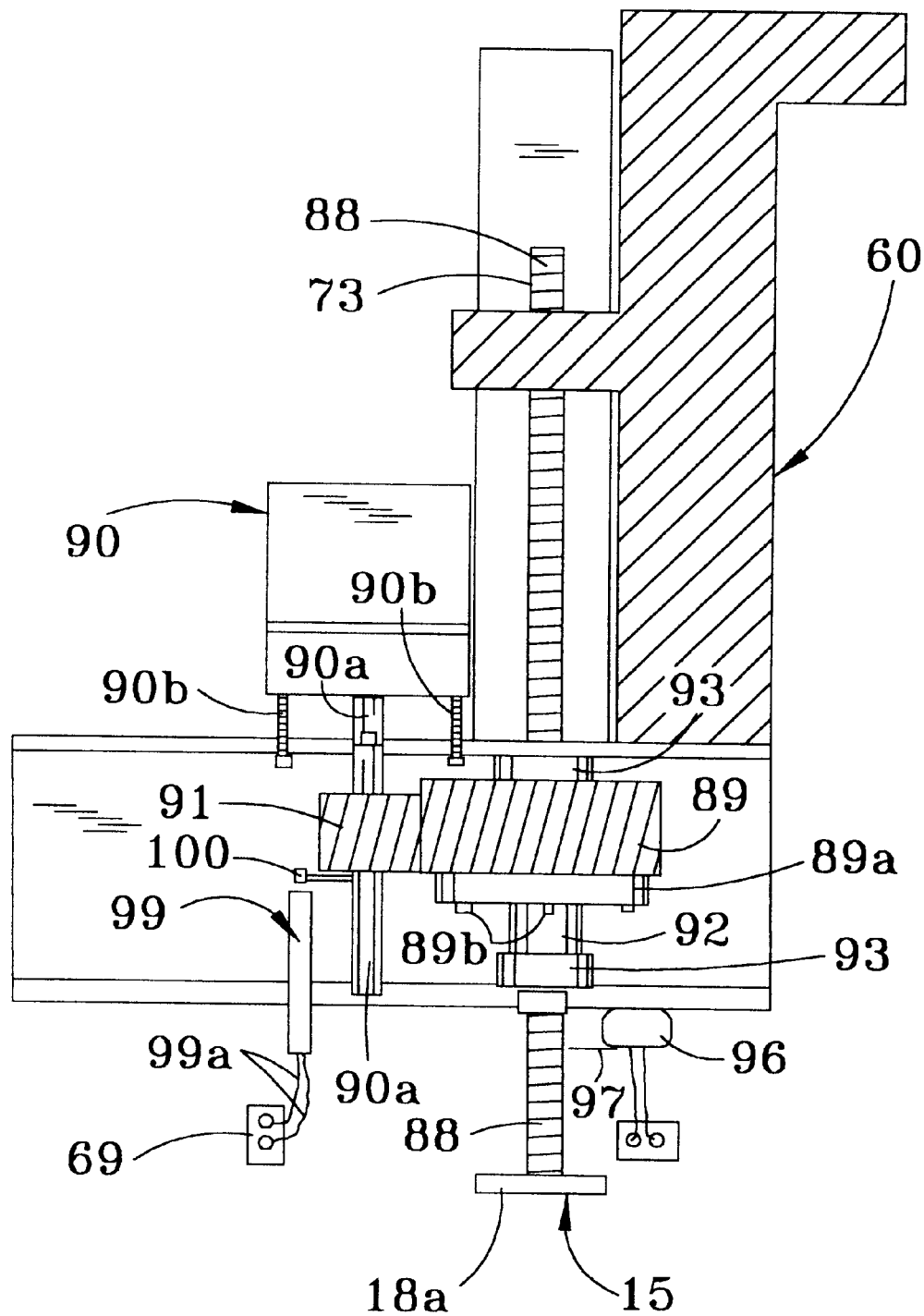
FIG. 18 is an enlarged view of the leg extension mechanism illustrated in FIG. 17.

Referring now to FIGS. 17 and 18 of the drawings, front-to-rear leveling of the trailer 60 is accomplished by means of additional infrared level switches 14, provided in the front section of the trailer 60, as well as a pair of motor-operated leg extensions 15, fitted with leg extension pads 18a extending from the bottom of the trailer 60, as illustrated. Each of the motor-operated leg extensions 15 is characterized by a threaded leg 88, recessing into a corresponding leg access opening 73, provided in the trailer 60 and extending through a leg gear 89, to which is attached a leg gear flange 89a by means of flange bolts 89b, as illustrated in FIG. 18. A threaded nut 92 is secured to the leg gear flange 89a and threadably receives the threaded leg 88, as further illustrated in FIG. 18. A pair of bearings 93 are positioned above the leg gear 89 and below the threaded nut 92 to facilitate rotatable operation of the leg gear 89 and the threaded nut 92, responsive to meshing of a corresponding drive motor gear 91 mounted on the motor shaft 90a of a leg drive motor 90. Each leg drive motor 90 is typically mounted in the trailer 60 by means of motor mounts 90b. Operation of each electric drive motor 90 effects rotation of the drive motor gear 91 and corresponding rotation of the corresponding threaded nut 92. Accordingly, rotation of the threaded nuts 92, engaging the respective threaded legs 88, causes the threaded legs 88 to project from the bottom of the trailer 60 or extend into the leg access opening 73 in the trailer 60, depending upon the direction of rotation of the motor shaft 90a and thus, the drive motor gear 91. A proximity switch 99 is also attached in fixed relationship to the trailer 60 adjacent to the motor shaft 90a and includes a proximity switch sensor 100 for monitoring the number of rotations of the motor shaft 90a and the drive motor gear 91, for memory purposes which will be hereinafter further described. A battery 48 is also provided in the trailer 60 as illustrated in FIG. 17, for supplying power to the micro-controller 80 and the respective operating components of the loading and unloading system when the trailer 60 is disconnected from the pickup truck 57.

As further illustrated in FIGS. 17 and 18 of the drawings, a leg limit switch 96 is mounted on the underside of the trailer 60 in close proximity to each of the threaded legs 88 and includes a switch arm 97, extending toward the threaded leg 88 and positioned in alignment with the leg extension pad 18a, to facilitate termination of operation of the corresponding leg drive motor 90 when the leg extension pad 18a contacts the switch arm 97 of the respective leg limit switch 96, pursuant to retraction of the threaded legs 88 inside the leg access openings 73, respectively, of the trailer 60, as hereinafter further described. A bed positioning switch 101 is also mounted on the hitch arm and pin 2 and is designed to direct an infrared beam downwardly toward the truck bed 58 of the pickup truck 57, to determine when the pickup truck 57 has been removed from the arm and pin 2, as hereinafter described.

Referring again to FIG. 16 of the drawings, current limiters 87 are provided in the electrical connections to the respective rear leg drive motors 90 for limiting downward travel of the respective threaded legs 88 when the corresponding leg extension pads 18a touch the ground in the stabilizing operation, also as hereinafter further described.

Figure 13A:
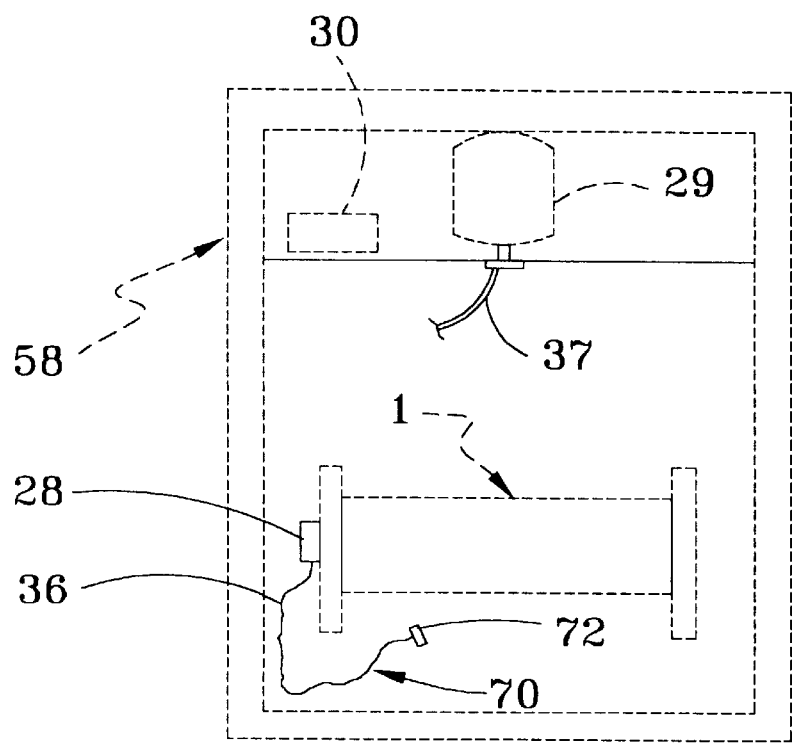
FIG. 13A is a top view of the apparatus illustrated in FIG. 13 adapted for application on the second embodiment of the invention.
Figure 19:
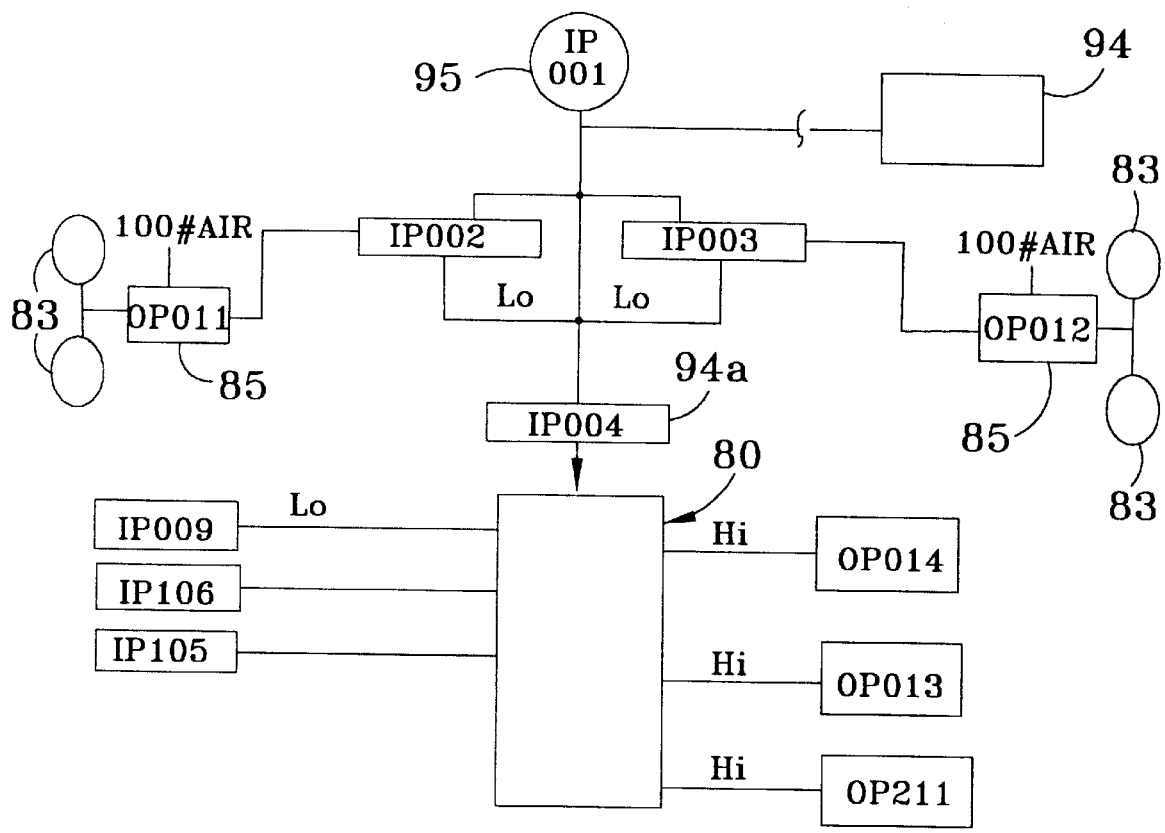
FIGS. 19–24 illustrate micro-controller logic sequences for operating the respective components in the second embodiment of the invention.

Referring now to FIGS. 19–25 of the drawings, logic schematics of the micro-controller 80 illustrate the various leveling commands to the corresponding operational control systems for leveling the trailer 60 in the second embodiment of the invention. Referring to these logic schematics, the automatic fifth wheel loading system of this invention is operated as follows. As illustrated in FIGS. 15 and 19, insertion of a key (not illustrated) in a key switch 95 (FIG. 25, 100) typically located in the cab of the pickup truck 57 or in the control compartment 6 of the trailer 60, illustrated in FIG. 1, furnishes power to a pair of push button switches 94 and 94a. The micro-controller 80 then scans inputs 002, 003 and 004 (push button switch 94a), input 002 and 003 of which control operation of the air bag infrared level switches 14 illustrated in FIGS. 15 and 16 of the drawings. As further illustrated in FIG. 15, if either side of the trailer 60 is low (FIG. 25, 102, 104), the input logic on the corresponding side will have a "high" output to the micro-controller 80. For instance, if the driver's side of the trailer 60 is lower than the passenger's side (FIG. 25, 106) then the input 002 will be "high" going to the micro-controller 80. Accordingly, this will cause output 011 to also go "high", which action energizes the appropriate solenoid valve 85, illustrated in FIG. 16, thus connecting a typically 100-pound air supply (typically air tank 29, illustrated in FIGS. 13 and 13A) to the respective air bags 83 on the corresponding side of the trailer 60 via the air hoses 37 and air bag service lines 83a (FIG. 25, 108). This inflates the air bags 83 and raises the low side of the trailer 60 until the trailer 60 is level from side-to-side (FIG. 25, 109). At this point, input 002 will go "low" to the micro-controller 80, making output 011 go "low", thus closing the air flow through the appropriate solenoid valve 85 to the air bags 83 (FIG. 25, 111). A corresponding action would take place under circumstances where the trailer 60 is initially low on the passenger's side, except that the micro-controller input 003, which determines inflation of the passenger's side air bags 83 by operation of the corresponding air bag infrared level switch 14, and micro-controller output 012, which controls the passenger's side solenoid valve 85, would be activated (FIG. 25, 110, 112, 113, 116). When the trailer 60 is thusly level from side-to-side, inputs 002 and 003 will both be "low" when scanned by the micro-controller 80, as would be the case if the trailer 60 was level to begin with under circumstances, for example, where it was parked on a level pad. If one of the outputs 011 or 012 controlling the solenoid valves 85 has been energized (FIG. 25, 114), the micro-controller 80 will monitor the input 108 or 109, which, in turn, monitor the pressure switches 63 (FIG. 25, 120), to determine whether a leak in any of the air bags 83 might cause one side of the trailer 60 to lose pressure. The micro-controller 80 also operates to maintain a minimum selected pressure on the air bags 83 in the event of any such leaks by this continuous monitoring of the inputs 108 and 109, as appropriate, to maintain the minimum air bag pressure on each side of the trailer 60. If it is necessary to pressurize any of the air bags 83 more than a selected number of times, typically six times in a one-hour time interval (FIG. 25, 122), an output 211 will go "high", by operation of the micro-controller 80, thus illuminating a warning light 98, typically located in the control compartment 6 of the trailer 60 (FIG. 25, 124), thus advising the operator as to the leak.

Figure 12A:
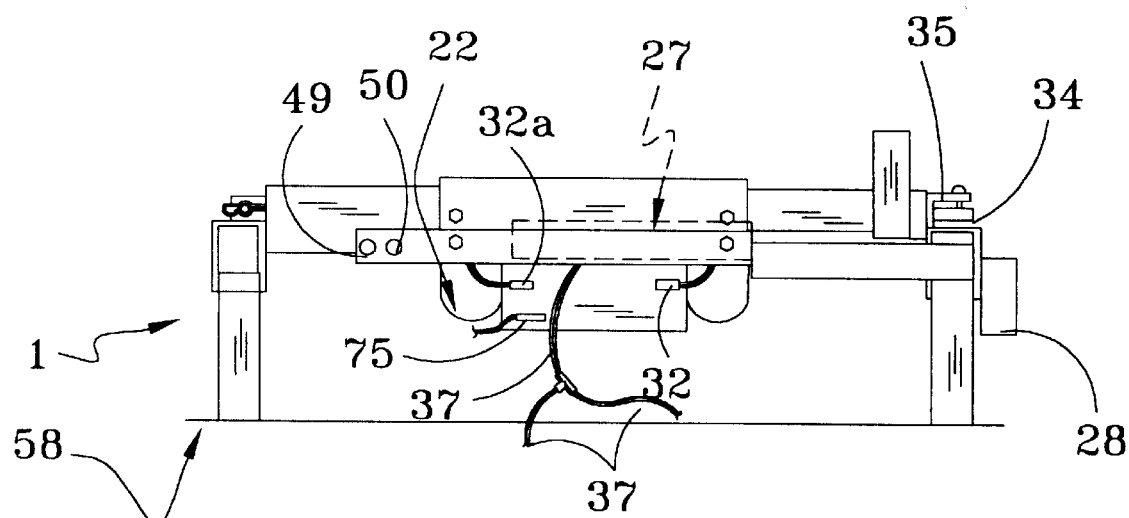
FIG. 12A is a front view of the hitch stand and fifth wheel apparatus illustrated in FIGS. 10 and 11, more particularly illustrating the addition of hitch height clearance and pin clearance or positioning infrared switches in the second embodiment of the invention.

After the trailer 60 is leveled from side-to-side as described above, the unloading push button 94a is engaged (FIG. 25, 126), the input 004 becomes "high" and inputs 002 and 003 are "low" since the trailer 60 is now level. Furthermore, input 009, which monitors the hitch clearance switch (infrared emitter 32 and infrared receiver 32a) illustrated in FIG. 12A, is also low (FIG. 25, 128). In this state, the micro-controller 80 causes output 013 and 014 to go "high" and start the respective leg drive motors 90, illustrated in FIGS. 17 and 18, to drive the corresponding threaded legs 88 downwardly (FIG. 25, 130), as the two threaded nuts 92 are rotated by operation of the corresponding drive motor gears 91 and leg gears 89, also illustrated in FIG. 18. If either input 002 and 003 are not "low" at this point, this step will not begin until the trailer 60 is level from side-to-side, as determined by the air bag infrared level switches 14 and as described above, and input 002 and 003 are both made "low" to the micro-controller 80. The current applied to both of the leg drive motors 90 is monitored by current sensors (not illustrated) monitored by micro-controller inputs 105 and 106, further illustrated in FIG. 19. As long as the current in both of the leg drive motors 90 is within typically one amp of each other, both of the threaded legs 88 will continue to move downwardly, until a first one of the threaded legs 88 strikes the ground or supporting surface before the other (FIG. 25, 132, 134). At this point, the current to the first leg drive motor 90 of the corresponding threaded leg 88 will elevate to exceed the one amp preset current differential and will then terminate (FIG. 25, 136) until the second threaded leg 88 also touches the supporting surface and the current in the second leg drive motor 90 also elevates and reaches approximately the same level as the termination current on the first leg drive motor 90 (FIG. 25, 138). With the current of both motors equal (FIG. 25, 140) the first leg drive motor will then again start (FIG. 25, 142) and the threaded legs 88 will be driven simultaneously downwardly until the hitch arm plate 2a of the hitch arm and pin 2 of the trailer 60 reaches a height of about one-eighth of an inch above the fifth wheel 22 in the bed of the pickup truck 57 (FIG. 25, 144). Under these conditions the hitch pin 24, illustrated in FIG. 3, no longer interrupts the infrared beam between the infrared emitter 32 and the infrared receiver 32a. Accordingly, the input 009 will now go "high" and the micro-controller 80 then causes the outputs 013 and 014 to go "low", thus stopping both of the leg drive motors 90 and terminating downward extension of the respective threaded legs 88 (FIG. 25, 146).

Figure 20:
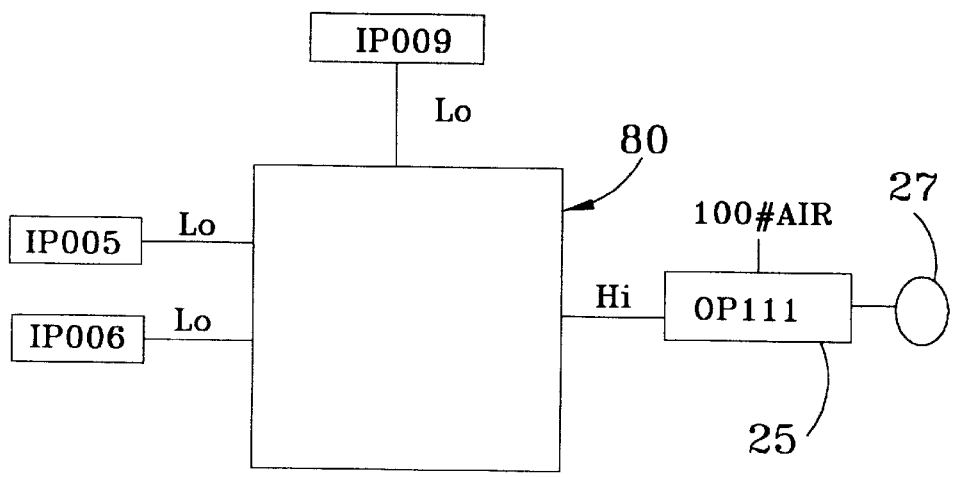
Figure 21:
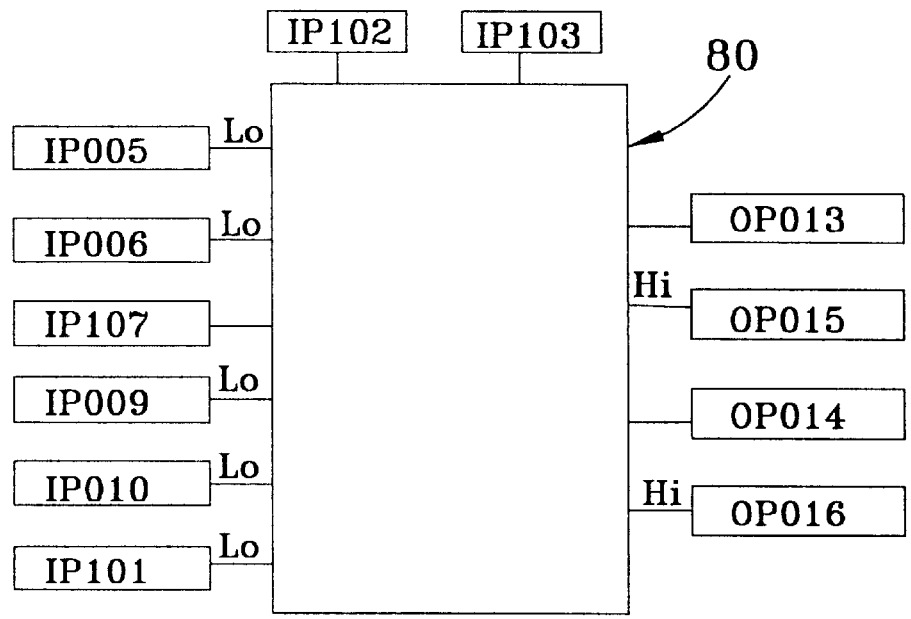

Referring now to FIGS. 18, 20 and 21 of the drawings, when the respective threaded legs 88 are initially driven downwardly by operation of the leg drive motors 90 as described above, the leg limit switches 96 were closed as the leg extension pads 18a descended from contact with the corresponding switch arms 97 of the respective leg limit switches 96. This action caused inputs 005 and 006 to go "low" to the micro-controller 80. When these inputs are both "low" and the input 009 from the hitch clearance switch 32–32a goes "high", the micro-controller 80 causes the output 111 to go "high", thus opening a hitch opening cylinder solenoid valve 27c and applying typically 100 pounds of air pressure on the hitch opening cylinder 27 from the air tank 29, through the air hose 37, to open the hitch yoke 22, as illustrated in FIGURES 10A and 11A and FIG. 25, 148, of the drawings and as heretofore described with respect to the first embodiment of the invention. This allows the pickup truck 57 to pull from under the trailer 60. At this point, input 010, which monitors the infrared pin position switch 75, illustrated in FIG. 12A, and input 101, which monitors the bed positioning switch 101, illustrated in FIG. 17, will both be "high" to the micro-controller 80 (FIG. 25, 150). Accordingly, as the pickup truck 57 is pulled forwardly, the input 010 will go "low", but the input 101 will continue to be "high" and suspend further operation until the pickup truck 57 has cleared the trailer 60 according to the bed positioning switch 101.

Referring again to FIG. 21 of the drawings, a determination is made whether the front of the trailer 60 is lower than the back (FIG. 25, 151) from the front-to-rear infrared level switch 14. When all of the inputs 009, 010 and 101 described above are "low" to the micro-controller 80, and input 102, which monitors an infrared level switch 14 (FIG. 25, 152) mounted in the front of the trailer 60 (illustrated in FIG. 17), is "high", and threaded leg 88 control inputs 005 and 006 are both "low", the micro-controller 80 will instruct outputs 015 and 016 to go "high" and lower the trailer 60 (FIG. 25, 156) until the input 102 goes "low", thus indicating that the trailer 60 is level front-to-back. Simultaneously, the microcontroller 80 will monitor input 107, which, in turn, monitors the proximity switch 99, to count the number of turns of one of the drive motor gears 91, illustrated in FIG. 18 and FIG. 25, 154 until the corresponding leg drive motor 90 is stopped by input 102 going "low", as heretofore described (FIG. 25, 160). This same procedure will take place if the trailer 60 is high in the rear, except that the microprocessor 80 will then cause the input 103 to be "high" instead of the input 102, and the output 013 and 014 will be activated instead of outputs 015 and 016 (FIG. 25, 162–165).

Figure 22:
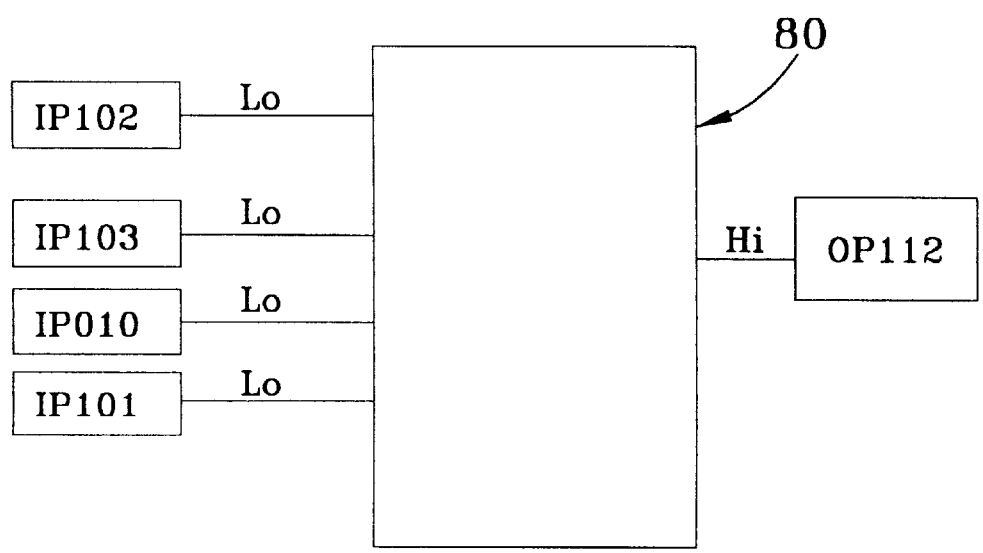

Referring now to FIG. 22 of the drawings, when inputs 102, 103, 010 and 101 are all "low", the micro-controller 80 will instruct the output 112 to go "high" and drive both of the motor-operated leg extensions 15 located in the rear of the trailer 60, as illustrated in FIG. 15, downwardly in the same manner as the front motor-operated leg extensions 15, until the corresponding leg extension pads 18a contact the ground or supporting surface. As in the case of the front motor-operated leg extensions 15, the rear motor-operated leg extensions 15 are provided with leg drive motors 90, each having a motor shaft 90a, to which is attached a leg gear 89 that meshes with the corresponding leg gear 89 attached to a threaded nut 92, receiving a threaded leg 88. Accordingly, the motor-operated leg extensions 15 in the rear of the trailer 60 operate in the same manner as the motor-operated leg extensions 15 in the front thereof. When the motor-operated leg extensions 15 located in the rear of the trailer 60 are operated such that the corresponding leg extension pads 18a touch the supporting surface, the current limiters 87, illustrated in FIG. 16, operate at a selected preset value to terminate operation of the respective leg drive motors 90 and the trailer 60 is now stabilized in level camping configuration.

Figure 23:
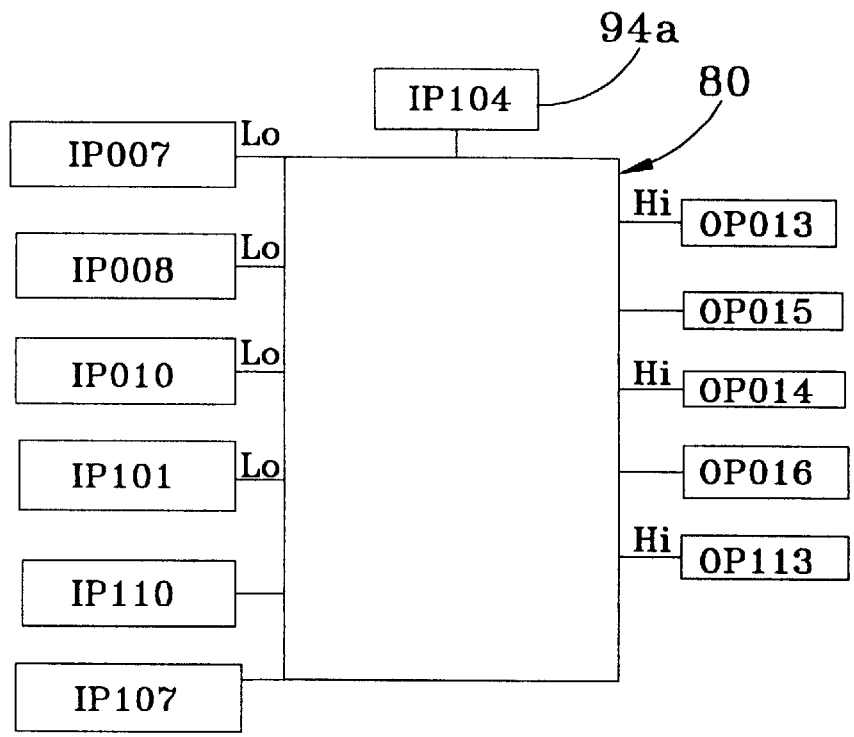

When it is desired to re-attach the pickup truck 57 to the trailer 60, the pickup truck 57 is initially positioned in front of the trailer 60 and all electric cables and air lines (not illustrated) are re-attached in conventional fashion. Referring now to FIG. 23 of the drawings, when the push button switch 94a is pushed (FIG. 25, 168) input 104 is activated to the micro-controller 80 and operates output 113 to drive the motor-operated leg extensions 15 located in the rear of the trailer 60 upwardly (FIG. 25, 170). Upward movement of the motor-operated leg extensions 15 is terminated by contact between the respective leg extension pads 18a and the switch arms 97 of the corresponding leg limit switches 96, respectively (FIG. 25, 172). When the inputs 007 and 008 go "high", the micro-controller 80 recalls from memory (represented by input 110), the number of turns that was necessary to lower the front end of the trailer 60 from the position of the hitch arm plate 2a of the hitch arm and pin 2 approximately ⅛ of an inch above the fifth wheel 22, to the location at the leveled position (FIG. 25, 174). The micro-controller 80 then instructs the front end leg drive motors 90 to operate together in concert the opposite direction and extend the respective threaded legs 88 to again position the hitch arm plate 2a about ⅛ of an inch above the fifth wheel 22 for re-attachment of the trailer 60 to the pickup truck 57. Specifically, reversal of the leg drive motors 90 by the micro-controller 80 is accomplished by the micro-controller memory, wherein the pair of outputs 013 and 014 or 015 and 016 used in the front-to-rear trailer leveling procedure are configured in memory, and the pair not used in this leveling procedure is now used to re-position the trailer 60 into the hook-up configuration. The micro-controller 80 monitors input 107 and counts down from the number previously stored in memory, which is the count of the proximity switch 99 and when the current reaches zero, the trailer 60 will stabilize and is ready for re-attachment to the pickup truck 57 (FIG. 25, 176).

Figure 24:
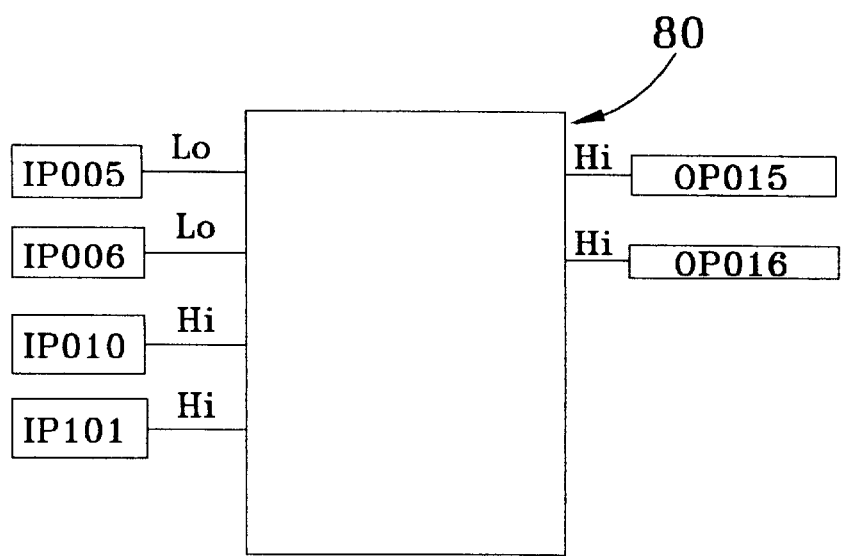
Figure 25A:
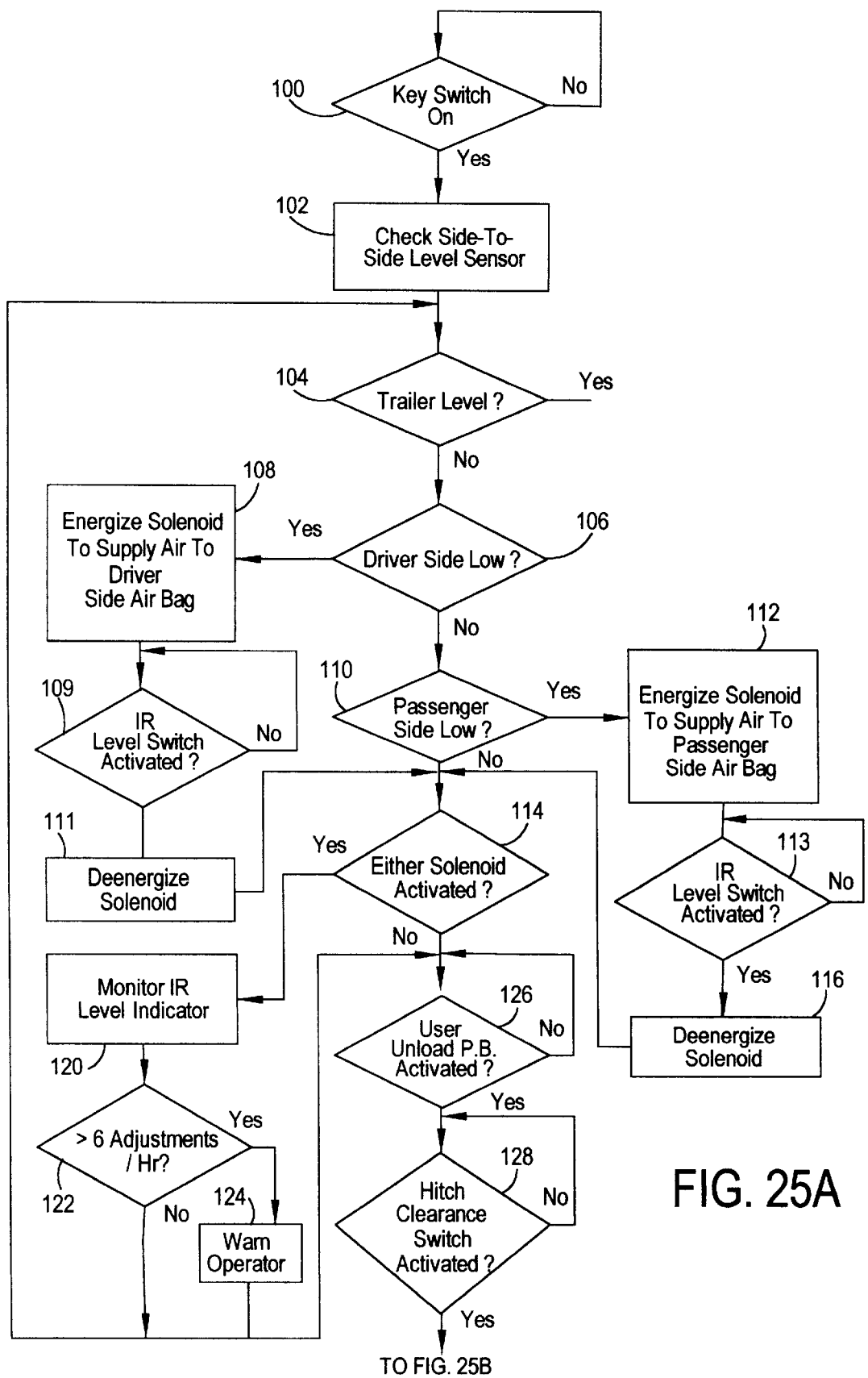
FIG. 25 is a flow chart showing a manner by which the micro-controller of the second embodiment of the invention may be programmed.
Figure 25B:
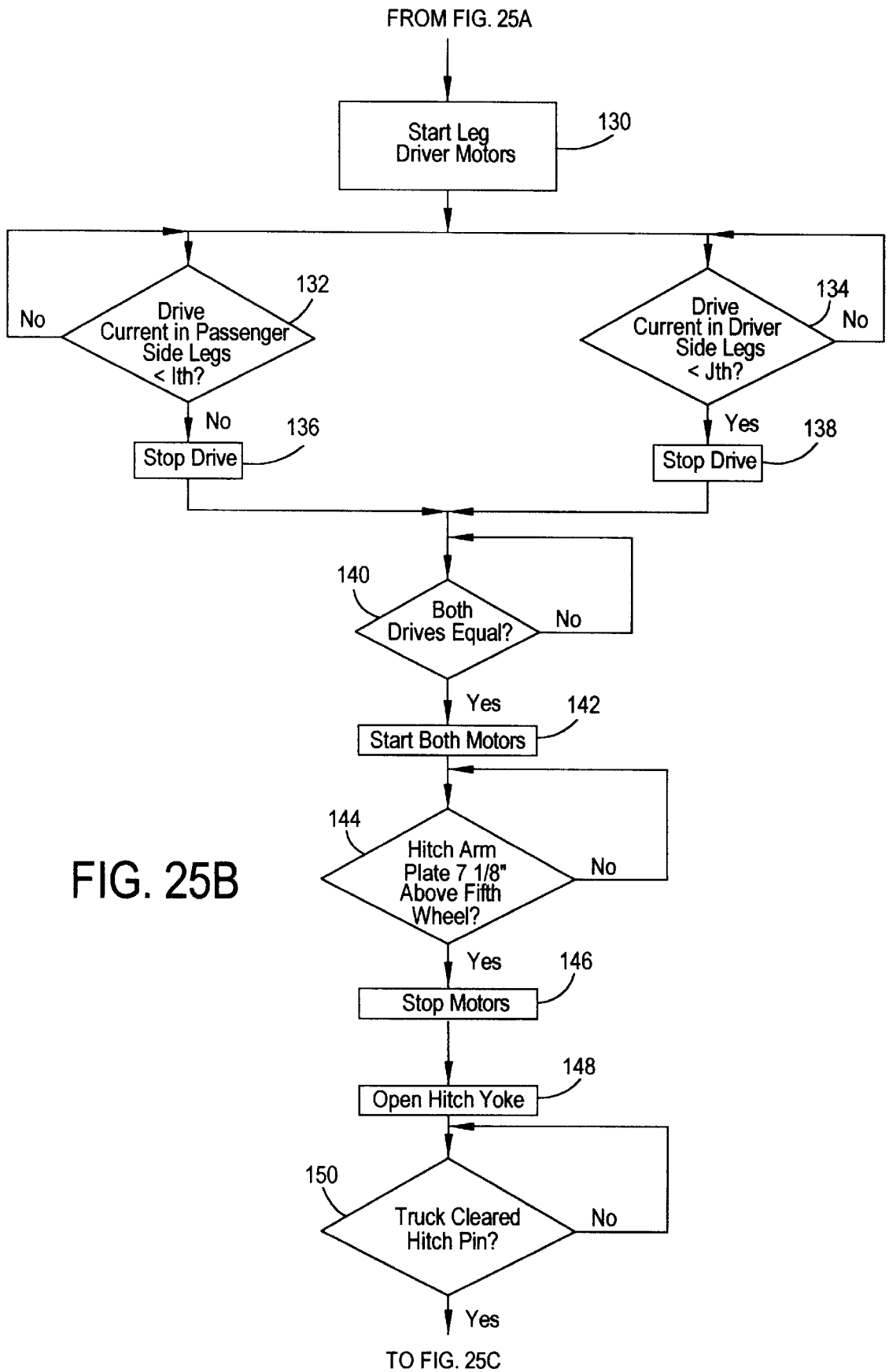
Figure 25C:
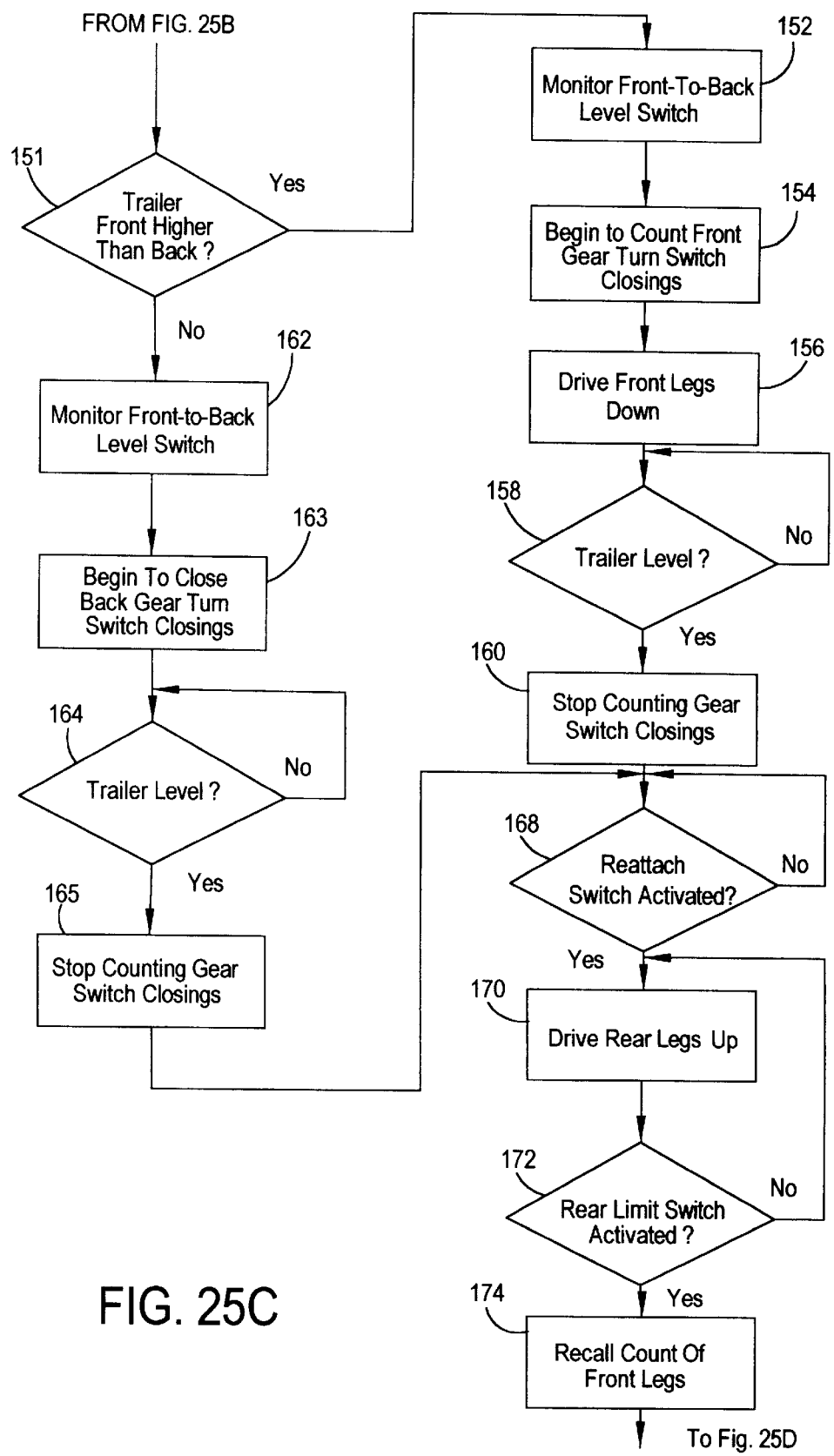
Figure 25D:
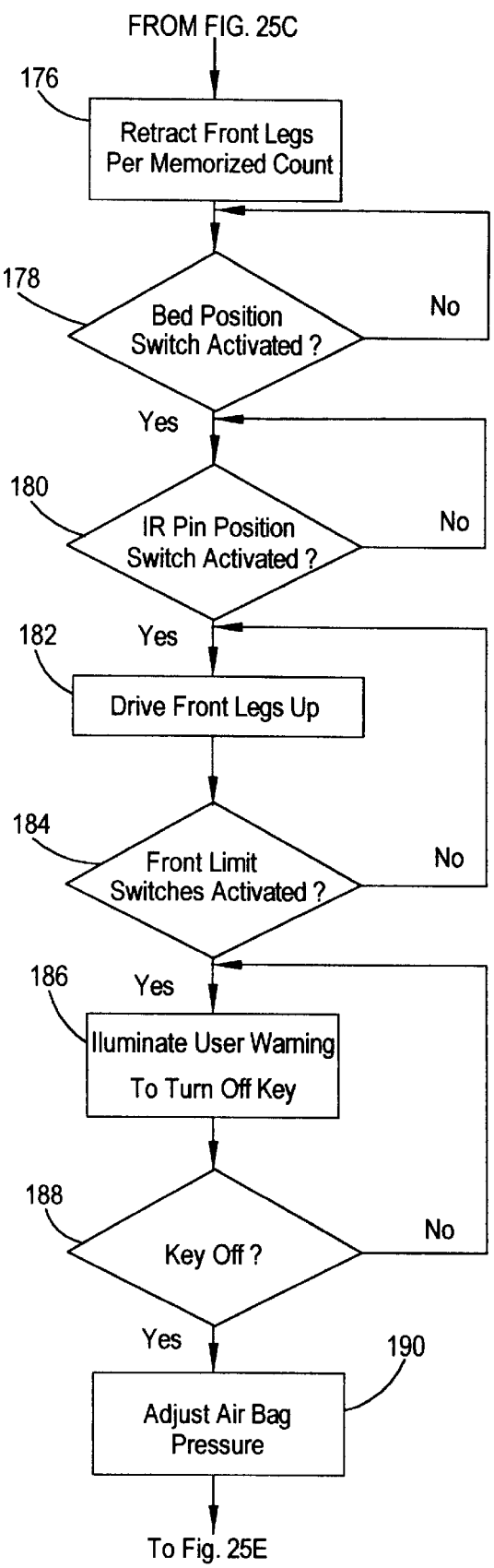

Referring now to FIG. 24 of the drawings, when the pickup truck 57 is backed under the hitch arm and pin 2 of the trailer 60, the input 101 monitoring the bed positioning switch 101 will go "high" (FIG. 25, 178) and no further action takes place until input 010, which monitors the infrared pin position switch 75, also goes "high" (FIG. 25, 180), all as monitored by the micro-controller 80. When input 007 and 008 go "low" and terminate operation of the rear motor operated leg extension 15, controlled by the leg limit switches 96, and the inputs 010 and 101 are "high", as heretofore described, the micro-controller 80 will instruct outputs 015 and 016 to also go "high" and drive the front threaded legs 88 upwardly by operation of the corresponding leg drive motors 90 (FIG. 25, 182). This action continues until the micro-controller 80 detects the outputs 005 and 006 going "high" (FIG. 25, 184) and then instructs 015 and 016 to go "low" to complete the attachment of the trailer 60 to the pickup truck 57. The micro-controller 80 will then instruct the output 116 to go "high", which action illuminates an indicator light 81, typically located in the control compartment 6 of the trailer 60, advising the operator to turn off the key switch 95, illustrated in FIG. 19 (FIG. 25, 186, 188). Accordingly, when the key switch 95 is turned off, the input 001 goes "low", and inputs 005 and 006 are "low", the micro-controller 80 instructs the air bag outputs 011 or 012 to go "low" and the air bag solenoid outputs 114 and 115 to go "high" and cause typically 15 to 20 pounds of regulated air to flow through the regulated air hoses 37a, into the air bag service lines 83a and then to all four air bags 83. This output will stay "high" for three minutes and then go "low", which seals a predetermined pressure in the respective air bags 83 (FIG. 25, 190). The micro-controller 80 will then monitor the air bag pressure by operation of pressure switches 63, provided in the air bag service lines 83a, as illustrated in FIG. 16, and will instruct the outputs 114 and 115, to go "high" again if the pressure drops typically three pounds below the preset pressure (FIG. 25, 192), as heretofore described, thus causing outputs 014 or 015 to go "high" and restoring the air bag pressure to the preset level (FIG. 25, 194). If this imbalance happens typically more than six times in a one-hour period (FIG. 25, 196), the output 211 will then go "high" by operation of the micro-controller 80, thus illuminating the warning light 98 and advising the operator that there is an air leak that needs to be checked (FIG. 25, 198).

While the preferred embodiments of the invention have been described above, it will be recognized and understood that various modifications may be made in the invention and the appended claims are intended to cover all such modifications which may fall within the scope and spirit of the invention.

Having described my invention with the particularity set forth above, what is claimed is:

1. An automatic system for uncoupling a trailer from a hitch yoke of a fifth wheel, and leveling the trailer, comprising:

an unlocking cylinder for mounting on said fifth wheel;

an unloading cylinder mechanism for mounting on the fifth wheel for selectively releasing the trailer from the fifth wheel and coupling the trailer to the fifth wheel; and an unlocking cylinder piston normally extending from said unlocking cylinder adjacent to said unloading cylinder for normally blocking an unloading action of said unloading cylinder mechanism; and a leveling mechanism for mounting on the trailer for automatically leveling the trailer after the trailer has been uncoupled from the fifth wheel responsive to selective retraction of said unlocking cylinder piston and said releasing of said trailer from the fifth wheel by said unloading cylinder mechanism and extension of said unloading cylinder piston in said unloading cylinder.

2. The automatic fifth wheel loading system of claim 1 wherein said unloading cylinder mechanism comprises an unloading cylinder provided on the fifth wheel and an unloading cylinder piston normally retracted in said unloading cylinder, said unloading cylinder piston connected to the hitch yoke in said fifth wheel, whereby operation of said unloading cylinder causes said unloading cylinder piston to extend and disengage the hitch yoke from the trailer.

3. The automatic fifth wheel loading system of claim 1 comprising an infrared unloading circuit provided in the fifth wheel, said infrared unloading circuit having a first infrared beam directed on the trailer for monitoring engagement of the trailer with the fifth wheel.

4. The automatic fifth wheel loading system of claim 3 wherein said unloading cylinder mechanism comprises an unloading cylinder provided on the fifth wheel and an unloading cylinder piston normally retracted in said unloading cylinder, said unloading cylinder piston connected to the hitch yoke in the fifth wheel, whereby operation of said unloading cylinder causes said unloading cylinder piston to extend and disengage the hitch yoke from the trailer.

5. The automatic fifth wheel loading system of claim 1 comprising an infrared leveling switch provided in the trailer, said infrared leveling switch electrically connected to said leveling mechanism and having at least one pair of infrared beams and at least one pair of pendulums pivotally disposed to interrupt said Infrared beams, respectively, whereby the trailer is level when said infrared beams are interrupted by said pendulums.

6. The automatic fifth wheel loading system of claim 5 comprising an infrared unloading circuit provided in the fifth wheel, said infrared unloading circuit having a first infrared beam directed on the trailer for monitoring engagement of the trailer with the fifth wheel.

7. The automatic fifth wheel loading system of claim 6 wherein said unloading cylinder mechanism comprises an unloading cylinder provided on the fifth wheel and an unloading cylinder piston normally retracted in the unloading cylinder, said unloading cylinder piston connected to the hitch yoke in said fifth wheel, whereby operation of said unloading cylinder causes said unloading cylinder piston to extend and disengage said hitch yoke from the trailer.

8. An automatic fifth wheel loading system for uncoupling a coupler of a trailer from a hitch yoke of a fifth wheel mounted in a carrying vehicle, and recoupling the gooseneck coupler to the yoke of the fifth wheel, said system comprising an unloading cylinder provided on the fifth wheel and an unloading cylinder piston normally retracted in said unloading cylinder, said unloading cylinder piston connected to the hitch yoke in said fifth wheel, whereby operation of said unloading cylinder causes said unloading cylinder piston to sequentially extend and disengage, and retract and engage hitch yoke from the trailer, respectively; an unlocking cylinder provided on the fifth wheel and an unlocking cylinder piston normally extending adjacent to said unloading cylinder for normally blocking said unloading cylinder piston; and an infrared unloading circuit having a first infrared beam directed on the trailer for monitoring engagement of the trailer with the fifth wheel.

9. The automatic fifth wheel loading system of claim 8 comprising at least one leveling mechanism provided on the trailer for automatically leveling the trailer after the trailer is uncoupled from the fifth wheel, said leveling mechanism including an infrared leveling circuit provided in the trailer, said infrared leveling circuit having at least one pair of infrared beams and at least one pair of pendulums privotally disposed to interrupt said infrared beams, respectively, whereby the trailer is level when said infrared beams are interrupted by said pendulums.

10. A mechanism for automatically uncoupling a trailer hitch portion on a trailer from a hitch receiver portion on a towing vehicle, and leveling the trailer, comprising:
    a control mechanism for operating a microcontroller;
    a microcontroller connected to said control mechanism for controlling said uncoupling and said leveling;
    at least one pair of two-piece height adjustable supporting legs for supporting the trailer;
    a mechanism for leveling the trailer at least from side-to-side, said mechanism for leveling the trailer at least from side-to-side controlled by said microcontroller, and said mechanism for leveling the trailer at least from side-to-side comprising at least a plurality of air bags for mounting on the trailer for selectively leveling the trailer at least from side-to-side and an air control mechanism connected to said air bags for selectively controlling an air pressure in each of said air bags for leveling the trailer at least from side-to-side, according to signals from said microcontroller;
    a mechanism including said microcontroller for selectively activating said two-piece height adjustable supporting legs for raising a portion of the trailer hitch a predetermined distance above the hitch receiver, according to signals from said microcontroller, while maintaining the trailer level at least from side-to-side; and
    an uncoupling mechanism controlled by said microcontroller for automatically releasing the trailer hitch portion from the hitch receiver after the trailer has been leveled and the trailer hitch portion has been raised a predetermined distance above the hitch receiver.

11. The mechanism of claim 10 wherein the trailer hitch portion carried by the trailer is a hitch arm plate and the hitch receiver portion on a towing vehicle is a fifth wheel.

12. The mechanism of claim 10 wherein said mechanism for leveling the trailer at least from side to side further comprises a first pendulum and first infrared switches for detecting position of said first pendulum that indicates that the trailer is level from side-to-side.

13. The mechanism of claim 10 further comprising a leveling mechanism for leveling the trailer from front-to-back provided on the trailer, said leveling mechanism connected to said height adjustable legs and controlled by said microcontroller.

14. The mechanism of claim 13 wherein said leveling mechanism for leveling the trailer from front-to-back comprises a second pendulum and second infrared switches for detecting position of said second pendulum that indicates that the trailer is level from front-to-back.

15. A mechanism for automatically uncoupling a trailer hitch portion on a trailer from a hitch receiver portion on a towing vehicle, and leveling the trailer, comprising:
    a control mechanism for operating a microcontroller;
    a microcontroller connected to said control mechanism for controlling said uncoupling and programmed to:
    activate a plurality of air bags for mounting on the trailer for selectively leveling the trailer at least from side-to-side and an air control mechanism connected to said air bags for selectively controlling an air pressure in each of said air bags and leveling the trailer from side-to-side;

selectively activate a plurality of two-piece, height adjustable legs for mounting on the trailer for raising the trailer hitch portion a predetermined distance above the hitch receiver portion while maintaining the trailer level from side-to-side and stabilizing the trailer in a level position; and release the trailer hitch portion from the hitch receiver portion after the trailer has been leveled and the trailer hitch portion has been raised a predetermined distance above the hitch receiver portion.

16. The mechanism of claim 15 wherein the trailer hitch portion carried by the trailer is a hitch arm plate and said hitch receiver portion on a towing vehicle is a fifth wheel.

17. The mechanism of claim 15 comprising a first pendulum and first infrared switches electrically connected to said microcontroller for detecting a position of said first pendulum that indicates that said trailer is level from side-to-side.

18. The mechanism of claim 17 further comprising a leveling mechanism to level the trailer from front-to-back, and wherein said microcontroller is programmed to activate said leveling mechanism to level the trailer from front-to-back.

19. The mechanism of claim 18 wherein said leveling mechanism to level the trailer from front-to-back comprises a second pendulum and second infrared switches for detecting position of said pendulum that indicates that the trailer is level from front-to-back, said infrared switches providing input signals to said microcontroller.

20. The mechanism of claim 15 wherein said microcontroller is further programmed to accept a user command to reverse the decoupling process to couple the trailer hitch portion to the hitch receiver portion.

21. The mechanism of claim 15 wherein said microcontroller is further programmed, upon receipt of a user command, to:

selectively activate said height adjustable legs and said mechanism for leveling to restore the trailer to an original position;

lower the trailer hitch portion into the hitch receiver portion; and thereafter activate the hitch receiver portion to capture the trailer hitch portion.

22. A microcontroller implemented method for automatically uncoupling the trailer hitch of a trailer from a coupler on a towing vehicle, and leveling the trailer, comprising the acts of:

leveling the trailer from side-to-side by selectively inflating air bags provided on the trailer;

lowering a pair of motor-driven trailer jacks to raise the trailer hitch of the trailer to a predetermined distance above the coupler on said towing vehicle;

opening said coupler to release the trailer hitch therefrom;

leveling the trailer from front-to-back; and extending a pair of stabilizing legs from the trailer to stabilize the trailer.

23. The microcontroller implemented method of claim 22 wherein said act of leveling the trailer from side-to-side further comprises monitoring a position of a pendulum to control said act of selectively inflating said air bags.

24. The microcontroller implemented method of claim 22 wherein said act of lowering said trailer jacks to raise the trailer hitch of the trailer to a predetermined distance above the coupler on said towing vehicle comprises the acts of:

simultaneously activating first and second drive motors for said trailer jacks;

monitoring respective drive currents to said drive motors;

discontinuing said activating in a first drive motor when said drive current in said first drive motor exceeds a predetermined level above the drive current in a second drive motor and the drive current in said first drive motor is stored in a memory associated with said microcontroller when said first drive motor is stopped;

thereafter, reactivating said first drive motor when said drive current in said second drive motor equals said drive current stored in said memory associated with said microcontroller;

thereafter, simultaneously operating said first and second drive motors in concert for operating said trailer jacks until said hitch of the trailer is raised said predetermined distance.

25. The microcontroller implemented method of claim 22 wherein said leveling the trailer from front-to-back comprises adjusting an elevation of the trailer by operating at least a pair of said trailer jacks.

26. The microcontroller implemented method of claim 25 wherein said act of adjusting an elevation of the trailer by operating said at least a pair of said trailer jacks comprises the acts of:

simultaneously activating said first and second drive motors for said trailer jacks until a level sensor indicates that said trailer is level from front-to-back.

27. The microcontroller implemented method of claim 22 further comprising, during said act of leveling the pair of trailer jacks, counting respective revolutions of a screw member of at least one of said trailer jacks and storing the number and direction of said revolutions in said memory associated with said microcontroller to enable an original jack position to be restored.

28. The microcontroller implemented method of claim 22 further comprising, prior to said act of opening said coupler to release a portion of the hitch therefrom, requiring that said acts of leveling and lowering have been completed.

29. An automatic fifth wheel loading system for uncoupling a trailer from a fifth wheel having a hitch yoke, leveling the trailer and recoupling the trailer to the hitch yoke, said loading system comprising an unlocking cylinder mechanism and an unloading cylinder mechanism on the fifth wheel for sequentially releasing the trailer from the fifth wheel and coupling the trailer to the fifth wheel said unloading cylinder mechanism comprising an unloading cylinder on the fifth wheel and an unloading cylinder piston normally retracted in said unloading cylinder and normally engaging said unlocking cylinder mechanism, said unloading cylinder piston connected to the hitch yoke in the fifth wheel, whereby operation of said unlocking cylinder mechanism and said unloading cylinder causes said unloading cylinder piston to selectively extend and disengage the hitch yoke from the trailer and retract and reengage the hitch yoke with the trailer; and at least one leveling mechanism for mounting on the trailer for automatically leveling the trailer after the hitch yoke is disengaged from the trailer and the trailer is uncoupled from the fifth wheel.

30. An automatic fifth wheel loading system for uncoupling a trailer from a fifth wheel having a hitch yoke, leveling the trailer and recoupling the trailer to the hitch yoke, said loading system comprising an unlocking cylinder mechanism and an unloading cylinder mechanism for mounting on the fifth wheel for sequentially releasing the trailer from the fifth wheel and coupling the trailer to the fifth wheel; at least one leveling mechanism for mounting on the trailer for automatically positioning the trailer in a level configuration after the trailer is uncoupled from the fifth wheel, said leveling mechanism comprising at least one infrared leveling circuit having at least one infrared beam and at least one pendulum pivotally disposed to interrupt said infrared beam, whereby the trailer is level when said infrared beam is interrupted by said pendulum; and comprising a pair of extensible and retractable stabilizer legs for mounting in said trailer for stabilizing the trailer in said level configuration.

31. A mechanism for automatically uncoupling a trailer hitch element carried by a trailer from a hitch receiver on a towing vehicle, leveling the trailer and coupling the trailer hitch element to the trailer, comprising:
  a control mechanism for operating a microcontroller;
  a microcontroller electrically connected to said control mechanism for controlling said uncoupling, said leveling and said coupling;
  a pin clearance switch and a pin sensor switch for mounting on the hitch receiver for monitoring the position of a hitch pin in the trailer hitch element, and a bed sensor switch for mounting on the trailer for monitoring the bed of the towing vehicle, respectively;
  a pair of height-adjustable supporting legs for mounting in the trailer for supporting the trailer and a pair of stabilizing legs provided in the trailer for stabilizing the trailer after the trailer is leveled;
  a first leveling mechanism for mounting controlled by said microcontroller for leveling the trailer from side-to-side;
  a mechanism for mounting controlled by said microcontroller for selectively activating said height-adjustable supporting legs and raising a portion of the trailer hitch element a predetermined distance above the hitch receiver, according to signals from said pin clearance switch, said pin sensor switch and said microcontroller, while maintaining the trailer level from side-to-side;
  an uncoupling mechanism for mounting on the hitch receiver and controlled by said microcontroller for automatically releasing the trailer hitch element from the hitch receiver after the trailer has been leveled from side-to-side and the trailer hitch portion has been raised a predetermined distance above the hitch receiver;
  a second leveling mechanism for mounting on the trailer and controlled by said microcontroller for leveling the trailer from front-to-rear;
  a pair of stabilizing legs for extending from the rear of the trailer for stabilizing the trailer in a level configuration;
  a counting mechanism connected to said mechanism controlled by said microcontroller for determining the initial position of the trailer hitch element, whereby the trailer is uncoupled from the hitch receiver, leveled by said first leveling mechanism and said second leveling mechanism, stabilized by said stabilizing legs and sequentially recoupled to the hitch receiver, responsive to operation of said counting mechanism and said microcontroller.

32. A mechanism for automatically uncoupling a trailer hitch element carried by the trailer from a hitch receiver on a towing vehicle, leveling the trailer and recoupling the trailer hitch element to the hitch receiver, comprising:
  a control mechanism for operating a microcontroller;
  a microcontroller electrically connected to said control mechanism for controlling said uncoupling, said leveling and said recoupling, said microcontroler programmed to:
    monitor a pin-clearance switch and a pin-sensing switch provided in the trailer hitch element and a bed sensing switch for mounting on the trailer for determining the relative proximity of the trailer and the towing vehicle;
    activate a mechanism for mounting on the trailer and leveling the trailer from side-to-side;
    selectively activate a pair of height-adjustable legs for mounting on the trailer and raising a portion of the trailer hitch a predetermined distance above the hitch receiver and releasing the trailer hitch element from the hitch receiver, while maintaining the trailer level from side-to-side;
    activate a mechanism for mounting on the trailer and leveling the trailer from front-to-back, said mechanism for leveling the trailer from side-to-side and said mechanism for leveling the trailer from front-to-back comprising a system of pendulums and infrared switches, respectively, for mounting on the trailer and detecting a position of said pendulum which indicates that the trailer is level from side-to-side and front-to-back, respectively, said infrared switches providing input signals to said microcontroller;
    extend a pair of stabilizing legs for extending from the rear of the trailer for stabilizing the trailer in a level configuration;
    retract said stabilizing legs into the trailer; and
    recouple the trailer hitch element to the hitch receiver, responsive to operation of said height adjustable legs and said microcontroller.

33. A microcontroller implemented method for automatically uncoupling a trailer from a hitch on a towing vehicle, comprising operating said microcontroller to complete the acts of:
  leveling the trailer from side-to-side;
  lowering at least a pair of two-piece motor-driven trailer jacks to raise the hitch of the trailer to a predetermined distance above a hitch-receiving member on said towing vehicle by simultaneously activating first and second drive motors for said motor-driven trailer jacks;
  monitoring respective drive currents to said first and second drive motors; discontinuing said activating of said first drive motor when a first drive current in said first drive motor exceeds a predetermined level above a second drive current in the second drive motor and the first drive current value is stored in a memory associated with said microcontroller when said first drive motor is stopped; thereafter, reactivating said first drive motor when said second drive current in said second drive motor equals said value stored in the memory associated with said microcontroller; and thereafter simultaneously operating said first and second drive motors in concert for operating said motor-driven trailer jacks until the hitch of the trailer is raised said predetermined distance as indicated by a pin clearance switch;
  thereby opening the hitch receiving member to release a portion of the hitch therefrom; and
  operating said motor-driven trailer jacks for leveling the trailer from front-to-back.

34. A microcontroller implemented method for automatically uncoupling a trailer pin on a trailer from a hitch on a towing vehicle, leveling the trailer and recoupling the trailer pin to the vehicle, comprising the acts of:

leveling the trailer from side-to-side;

lowering at least a pair of motor-driven trailer jacks to raise the trailer to a predetermined distance above the hitch on said towing vehicle;

opening the hitch to release the trailer pin therefrom;

leveling the trailer from front-to-back by adjusting an elevation of the trailer by operating said motor-driven trailer jacks, until a level sensor indicates that the trailer is level from front-to-back;

extending a pair of stabilizing legs from the trailer for stabilizing the trailer; and at a subsequent time, selectively recoupling the trailer to the towing vehicle by the acts of:

retracting said pair of stabilizing legs with respect to the trailer;

backing the towing vehicle beneath the trailer pin of the trailer and engaging the trailer pin with the hitch;

confirming by operation of a bed sensor switch and a pin sensor switch that the trailer pin is secure in the hitch; and operating said motor-driven trailer jacks to a towing configuration by said microcontroller.

35. A microcontroller implemented method for automatically uncoupling the pin of a trailer from a hitch on a towing vehicle, leveling the trailer and restoring the trailer to an original height above the hitch, comprising the acts of:

leveling the trailer from side-to-side;

adjusting an elevation of the trailer by operating a pair of motor-driven trailer jacks to position the trailer in a level position and simultaneously counting respective revolutions of a screw member in at least one of said motor-driven trailer jacks and storing the number and direction of said revolutions in a memory associated with said microcontroller to enable an original jack position to be restored; and operating said motordriven jacks and counting said revolutions of said screw member for restoring the trailer to said original height above the hitch.

* * * * *